United States Patent
Tandon et al.

(10) Patent No.: US 11,579,355 B2
(45) Date of Patent: Feb. 14, 2023

(54) LOW CROSS-TALK MULTICORE OPTICAL FIBER FOR SINGLE MODE OPERATION

(71) Applicant: CORNING INCORPORATED, Corning, NY (US)

(72) Inventors: Pushkar Tandon, Painted Post, NY (US); Snigdharaj Kumar Mishra, Wilmington, NC (US)

(73) Assignee: CORNING INCORPORATED, Corning, NY (US)

( * ) Notice: Subject to any disclaimer, the term of this patent is extended or adjusted under 35 U.S.C. 154(b) by 0 days.

(21) Appl. No.: 17/443,588

(22) Filed: Jul. 27, 2021

(65) Prior Publication Data
US 2022/0026629 A1    Jan. 27, 2022

Related U.S. Application Data

(60) Provisional application No. 63/056,869, filed on Jul. 27, 2020.

(51) Int. Cl.
  *G02B 6/02*     (2006.01)
  *G02B 6/028*    (2006.01)
  *G02B 6/036*    (2006.01)

(52) U.S. Cl.
  CPC ..... *G02B 6/02042* (2013.01); *G02B 6/02009* (2013.01); *G02B 6/0286* (2013.01);
  (Continued)

(58) Field of Classification Search
  CPC ............ G02B 6/02042; G02B 6/02214; G02B 6/02228; G02B 6/0281; G02B 6/0286; G02B 6/03616; G02B 6/03633
  See application file for complete search history.

(56) References Cited

U.S. PATENT DOCUMENTS

| | | | |
|---|---|---|---|
| 8,200,057 B2 * | 6/2012 | Han ..................... | G02B 6/0283 |
| | | | 385/127 |
| 8,588,569 B2 * | 11/2013 | Bookbinder ....... | G02B 6/03638 |
| | | | 385/124 |

(Continued)

FOREIGN PATENT DOCUMENTS

| | | | | |
|---|---|---|---|---|
| WO | 2013/082062 A1 | 6/2013 | | |
| WO | WO-2019168054 A1 * | 9/2019 | ....... | C03B 37/01211 |

OTHER PUBLICATIONS

Invitation to Pay Additional Fee; PCT/US2021/042894; dated Oct. 8, 2021; 14 pages; European Patent Office.
(Continued)

*Primary Examiner* — Ryan A Lepisto

(57) ABSTRACT

A multicore optical fiber comprises a common cladding and a plurality of core portions disposed in the common cladding. Each of the core portions includes a central axis, a core region extending from the central axis to a radius $r_1$, the core region comprising a relative refractive index $\Delta_1$, an inner cladding region extending from the radius $r_1$ to a radius $r_2$, the inner cladding region comprising a relative refractive index $\Delta_2$, and a depressed cladding extending from the radius $r_2$ to a radius $r_3$, the depressed cladding region comprising a relative refractive index $\Delta_3$ and a minimum relative refractive index $\Delta_{3\ min}$. The relative refractive indexes may satisfy $\Delta_1 > \Delta_2 > \Delta_{3\ min}$. The mode field diameter of each core portion may greater than or equal to 8.2 µm and less than or equal to 9.5 µm.

22 Claims, 9 Drawing Sheets

(52) U.S. Cl.
CPC ..... *G02B 6/02214* (2013.01); *G02B 6/02228* (2013.01); *G02B 6/03616* (2013.01); *G02B 6/03633* (2013.01); *G02B 6/0281* (2013.01)

(56) References Cited

U.S. PATENT DOCUMENTS

| | | | | |
|---|---|---|---|---|
| 8,737,792 | B2* | 5/2014 | Fini | G02B 6/02042 |
| | | | | 385/127 |
| 8,737,793 | B2* | 5/2014 | Imamura | G02B 6/0365 |
| | | | | 385/126 |
| 9,052,433 | B2* | 6/2015 | Dianov | G02B 6/02042 |
| 9,057,817 | B2* | 6/2015 | Bookbinder | G02B 6/0365 |
| 9,164,228 | B2* | 10/2015 | Hayashi | G02B 6/4401 |
| 9,201,192 | B2* | 12/2015 | Zhang | G02B 6/0285 |
| 9,250,383 | B2* | 2/2016 | Gruner-Nielsen | G02B 6/0288 |
| 9,529,144 | B2* | 12/2016 | Ishida | G02B 6/02 |
| 9,588,284 | B2* | 3/2017 | Sasaki | G02B 6/02219 |
| 9,726,816 | B2* | 8/2017 | Hayashi | G02B 6/3863 |
| 9,891,378 | B2* | 2/2018 | Imamura | C03B 37/01222 |
| 10,094,975 | B2* | 10/2018 | Bookbinder | G02B 6/4478 |
| 11,370,689 | B2 | 6/2022 | Khrapko | |
| 2013/0136405 | A1 | 5/2013 | Bookbinder et al. | |
| 2013/0294737 | A1 | 11/2013 | Dianov et al. | |
| 2017/0160466 | A1 | 6/2017 | Imamura et al. | |
| 2020/0379168 | A1* | 12/2020 | Mukasa | C03B 37/01211 |

OTHER PUBLICATIONS

Li, et al., "Coupled Mode Analysis of Crosstalk in Multicore Fiber with Random Perturbations, Optical Fiber Communication Conference, Optical Society of America, 2015, paper W2A.35".

M. Koshiba, et al., "Analytical Expression of Average Power-Coupling Coefficients for Estimating Intercore Crosstalk in Multicore fibers", IEEE Photonics J., vol. 4(5), 2012, pp. 1987-1995.

Shoichiro Matsuo, et al., "Crosstalk behavior of cores in multi-core portion under bent condition", IEICE Electronics Express, vol. 8, No. 6, Mar. 2011, pp. 385-390.

Szostkiewicz, et al., "Cross talk analysis in multicore optical fibers by supermode theory", Optics Letters, vol. 41, No. 16, 2016, pp. 3759-3762.

T. Hayashi, et al., "Physical Interpretation of Intercore Crosstalk in Multicore fiber: Effects of Macrobend, Structure Fluctuation, and Microbend", Optics Express, vol. 21(5), 2013, pp. 5401-5412.

* cited by examiner

LOW CROSS-TALK MULTICORE OPTICAL FIBER FOR SINGLE MODE OPERATION

CROSS-REFERENCE TO RELATED APPLICATIONS

This application claims the benefit of priority under 35 U.S.C. § 119 of U.S. Provisional Application Ser. No. 63/056,869 filed on Jul. 27, 2020, the content of which is relied upon and incorporated herein by reference in its entirety.

FIELD

The present disclosure pertains to optical fibers. More particularly, the present disclosure relates multicore optical fibers having core portions with a relative refractive index profile including a trench for achieving low cross-talk.

TECHNICAL BACKGROUND

The transmission capacity through single-mode optical fiber has theoretically reached its fundamental limit of around 100 Tb/s/fiber. Transmitting even 80 Tb/s in a single-mode optical fiber over transoceanic distance has proven challenging in the absence of an improved optical signal-to-noise ratio (OSNR). The actual capacity limit over about 10,000 km of a submarine single-mode optical fiber system used in a transoceanic transmission system is only about 50 Tb/s, even with advanced ultra-low-loss and low-nonlinearity optical fibers.

Multicore fiber (MCF) may exhibit less transmission loss when used in transoceanic applications. However, for practical use in ultra-long-haul submarine systems, the MCF should have ultra-low loss (i.e., low attenuation) to produce a high OSNR, have high spatial-mode density to increase the spatial channel count, and enable low differential group delay (DGD) between spatial modes to decrease the digital signal processing complexity. Also, the standard cladding diameter of 125 µm should be maintained so that no major modifications are needed for installation of the cable.

SUMMARY

Thus, there is a need for new optical fibers that solve the problems described above while having satisfactory attenuation and an increased transmission capacity.

A first aspect of the present disclosure includes a multi-core optical fiber comprising a common cladding and a plurality of core portions disposed in the common cladding. Each of the plurality of core portions comprises a central axis, a core region extending from the central axis to a radius r1, the core region comprising a relative refractive index $\Delta 1$ relative to pure silica, an inner cladding region encircling and directly contacting the core region and extending from the radius $r_1$ to a radius $r_2$, the inner cladding region comprising a relative refractive index $\Delta_2$ relative to pure silica, and a depressed cladding region encircling and directly contacting the inner cladding region and extending from the radius $r_2$ to a radius $r_3$, the depressed cladding region comprising a relative refractive index $\Delta_3$ relative to pure silica and a minimum relative refractive index $\Delta_{3\ min}$ relative to pure silica. In embodiments, the relative refractive indexes $\Delta_1$, $\Delta_2$, and $\Delta_3$ satisfy the relation $\Delta_1 \geq \Delta_2 > \Delta_{3\ min}$. The mode field diameter of each core portion is greater than or equal to 8.2 µm and less than or equal to 9.5 µm at a wavelength of 1310 nm. The zero dispersion wavelength of each core portion is greater than or equal to 1300 nm and less than or equal to 1324 nm.

A second aspect of the present disclosure may include the first aspect, wherein the common cladding comprises an outer radius $R_{CC}$ that is greater than or equal to 120 µm and less than or equal to 200 µm.

A third aspect of the present disclosure may include any of the first through second aspects, wherein the plurality of core portions comprises greater than or equal to 3 core portions and less than or equal to 8 core portions.

A fourth aspect of the present disclosure may include any of the first through third aspects, wherein the outer radius $R_{CC}$ is equal to 125 µm.

A fifth aspect of the present disclosure may include any of the first through fourth aspects, wherein the plurality of core portions are arranged in a 2×2 arrangement within the common cladding such that each central axis of a core portion of the plurality of core portions is separated from central axes of two adjacent core portions by a minimum core-to-core separation distance greater than or equal to 35 µm.

A sixth aspect of the present disclosure may include any of the first through fifth aspects, wherein a cable cutoff wavelength of each of the plurality of core portions is less than or equal to 1260 nm.

A seventh aspect of the present disclosure may include any of the first through sixth aspects, wherein the relative refractive index $\Delta_3$ of the entire depressed cladding region in each of the plurality of core portions is less than or equal to $\Delta_2$ such that the depressed cladding region forms a depressed-index trench in a relative refractive index profile of each core portion.

An eighth aspect of the present disclosure may include any of the first through seventh aspects, wherein the depressed-index trench in the relative refractive index profile of each core portion has a trench volume of greater than or equal to 30% $\Delta$ µm$^2$ and less than or equal to 75% $\Delta$ µm$^2$.

A ninth aspect of the present disclosure may include any of the first through eighth aspects, wherein the depressed-index trench in the relative refractive index profile of each core portion has a volume of greater than or equal to 40% $\Delta$ µm$^2$ and less than or equal to 70% $\Delta$ µm$^2$.

A tenth aspect of the present disclosure may include any of the first through ninth aspects, wherein the depressed-index trench extends to the radius $r_3$, wherein $r_3$ is greater than or equal to 11 µm and less than or equal to 20 µm.

An eleventh aspect of the present disclosure may include any of the first through tenth aspects, wherein $r_3$ is greater than or equal to 12 µm and less than or equal to 18 µm.

A twelfth aspect of the present disclosure may include any of the first through eleventh aspects, wherein the minimum relative refractive index $\Delta_{3\ min}$ occurs at $r_3$.

A thirteenth aspect of the present disclosure may include any of the first through twelfth aspects, wherein the relative refractive index $\Delta_3$ of the depressed cladding region of each core portion monotonically decreases from $\Delta_2$ at the radius $r_2$ to $\Delta_{3\ min}$ at $r_3$.

A fourteenth aspect of the present disclosure may include any of the first through thirteenth aspects, wherein the relative refractive index $\Delta_3$ of the depressed cladding region of each core portion continuously decreases from $\Delta_2$ at the radius $r_2$ to $\Delta_{3\ min}$ at $r_3$ such that the trench has a substantially triangular-shape.

A fifteenth aspect of the present disclosure may include any of the first through fourteenth aspects, wherein the relative refractive index $\Delta_{3\ min}$ of the depressed cladding region of each core portion is less than or equal −0.2% Δ and greater than or equal to −0.6% Δ.

A sixteenth aspect of the present disclosure may include any of the first through fifteenth aspects, wherein the depressed cladding region of each core portion comprises a down-dopant having a concentration that varies with radial distance from the central axis such that the depressed cladding region comprises a maximum down-dopant concentration at $r_3$ and a minimum down-dopant concentration at $r_2$.

A seventeenth aspect of the present disclosure may include any of the first through sixteenth aspects, wherein the down-dopant is fluorine and the maximum down-dopant concentration is greater than or equal to 1.2 wt % and less than or equal to 2.0 wt %.

An eighteenth aspect of the present disclosure may include any of the first through seventeenth aspects, wherein the maximum down-dopant concentration is greater than or equal to 1.2 wt % and less than or equal to 1.8 wt %.

A nineteenth aspect of the present disclosure may include any of the first through eighteenth aspects, wherein the inner cladding region of each of the core portions is substantially free of the down-dopant.

A twentieth aspect of the present disclosure may include any of the first through nineteenth aspects, wherein the mode field diameter of each core portion at 1310 nm is greater than or equal to 8.8 μm and less than or equal to 9.5 μm.

A twenty first aspect of the present disclosure may include any of the first through twentieth aspects, wherein the mode field diameter of each core portion at 1310 nm is greater than or equal to 9.0 μm and less than or equal to 9.5 μm.

A twenty second of the present disclosure may include any of the first through twenty first aspects, wherein the mode field diameter of each core portion at 1310 nm is greater than or equal to 9.1 μm and less than or equal to 9.5 μm.

A twenty third of the present disclosure may include any of the first through twenty second aspects, wherein the central axes of the plurality of core portions are separated from one another by a minimum separation distance that is greater than or equal to 35 microns.

A twenty fourth aspect of the present disclosure may include any of the first through twenty third aspects, wherein a cross-talk between each of the plurality of core portions and a nearest one of the plurality of core portions is less than or equal to −30 dB.

A twenty fifth aspect of the present disclosure may include any of the first through twenty fourth aspects, wherein a cross-talk between each of the plurality of core portions and a nearest one of the plurality of core portions is less than or equal to −50 dB.

A twenty sixth aspect of the present disclosure may include a multicore optical fiber comprising a common cladding and a plurality of core portions disposed in the common cladding. each of the plurality of core portions may comprise a central axis, a core region extending from the central axis to a radius $r_1$, the core region comprising a relative refractive index $\Delta_1$ relative to pure silica, an inner cladding region encircling and directly contacting the core region and extending from the radius $r_1$ to a radius $r_2$, the inner cladding region comprising a relative refractive index $\Delta_2$ relative to pure silica, and a depressed cladding region extending encircling and directly contacting the inner cladding region and from the radius $r_2$ to a radius $r_3$, the depressed cladding region comprising a relative refractive index $\Delta_3$ relative to pure silica and a minimum relative refractive index $\Delta_{3\ min}$ relative to pure silica. The relative refractive indexes $\Delta_1$, $\Delta_2$, and $\Delta_{3\ min}$ may satisfy the relations $\Delta_1 > \Delta_2 > \Delta_{3\ min}$ and $\Delta_2 \geq \Delta_3$ such that the depressed cladding region forms a depressed-index trench in a relative refractive index profile of each core portion between $r_2$ and $r_3$. In embodiments, $\Delta_3$ monotonically decreases to the minimum relative refractive index $\Delta_{3\ min}$ with increasing radial distance from the central axis of each core portion.

A twenty seventh aspect of the present disclosure may include the twenty sixth aspect, wherein the mode field diameter of each core portion at 1310 nm is greater than or equal to 8.2 μm and less than or equal to 9.5.

A twenty eighth aspect of the present disclosure may include any of the twenty sixth through twenty seventh aspects, wherein the zero dispersion wavelength of each core portion is greater than or equal to 1300 nm and less than or equal to 1324 nm.

A twenty ninth aspect of the present disclosure may include any of the twenty sixth through twenty eighth aspects, wherein the depressed-index trench in the relative refractive index profile of each core portion has a volume of greater than or equal to 40% Δ μm² and less than or equal to 70% Δ μm².

A thirtieth aspect of the present disclosure may include any of the twenty sixth through twenty ninth aspects, wherein a cable cutoff wavelength of each of the plurality of core portions is less than or equal to 1260 nm.

A thirty first aspect of the present disclosure may include any of the twenty sixth through thirtieth aspects, wherein each core region comprises a maximum relative refractive index $\Delta_{1\ max}$ relative to pure silica, wherein $\Delta_{1\ max}$ in each of the core portions is greater than or equal to 0.28% Δ and less than or equal to 0.45% Δ.

A thirty second aspect of the present disclosure may include any of the twenty sixth through thirty first aspects, wherein the refractive index profile of each core portion within the core region is a graded index profile.

A thirty third aspect of the present disclosure may include any of the twenty sixth through thirty second aspects, wherein an alpha value of the graded index profile is greater than or equal to 10.

A thirty fourth aspect of the present disclosure may include any of the twenty sixth through thirty third aspects, wherein an alpha value of the graded index profile is less than or equal to 5.

A thirty fifth aspect of the present disclosure may include any of the twenty sixth through thirty fourth aspects, wherein $r_3$ is greater than or equal to 12 μm and less than or equal to 18 μm.

A thirty sixth aspect of the present disclosure may include any of the twenty sixth through thirty fifth aspects, wherein $\Delta_3$ min is less than or equal to −0.2% Δ and greater than or equal to −0.6% Δ.

A thirty seventh aspect of the present disclosure may include any of the twenty sixth through thirty eighth aspects, wherein the common cladding comprises an outer radius $R_{CC}$ that is greater than or equal to 120 μm and less than or equal to 200 μm.

A thirty eighth aspect of the present disclosure may include any of the twenty sixth through thirty ninth aspects, wherein the plurality of core portions comprises greater than or equal to 3 core portions and less than or equal to 8 core portions.

A thirty ninth aspect of the present disclosure may include any of the twenty sixth through thirty eighth aspects, wherein the relative refractive index $\Delta_3$ of the depressed cladding region of each core portion continuously decreases from $\Delta_2$ at the radius $r_2$ to $\Delta_3$ min at $r_3$ such that the trench has a substantially triangular-shape.

A fortieth aspect of the present disclosure may include a method of forming a multicore optical fiber. The method includes forming a core region of a core cane, the core region comprising an up-dopant; and depositing an overclad layer around the core region to form a silica soot pre-form; consolidating the silica soot pre-form in a consolidation furnace. A time period T after beginning the consolidating of the silica soot pre-form, the method includes exposing the silica soot pre-form to a down-dopant. The time period T is determined based on a rate of diffusion of the down-dopant trough the overclad layer such that an inner cladding region of the overclad layer is substantially free of the down-dopant upon consolidation of the silica soot preform such that the consolidated silica soot preform comprises the core region comprising a relative refractive index $\Delta_1$ relative to pure silica, the inner cladding region comprising a relative refractive index $\Delta_2$ relative to pure silica, and a depressed cladding region comprising a relative refractive index $\Delta_3$ relative to pure silica that decreases between $\Delta_2$ and a minimum relative refractive index $\Delta_{3\ min}$. The method also includes inserting the consolidated silica soot preform into a soot blank to form a multicore preform; and drawing the multicore fiber preform into the multicore optical fiber.

A forty first aspect of the present disclosure may include the fortieth aspect, wherein the overclad layer is deposited around the core region using an outside vapor deposition process.

A forty second aspect of the present disclosure may include any of the fortieth through the forty first aspects, wherein the up-dopant comprises germanium.

A forty third aspect of the present disclosure may include any of the fortieth through the forty second aspects, wherein the down-dopant comprises fluorine.

A forty fourth aspect of the present disclosure may include any of the fortieth through the forty third aspects, wherein the overclad layer is deposited around the core region when the core region is in a partially consolidated state such that the core region is consolidated in conjunction with the overclad layer.

It is to be understood that both the foregoing general description and the following detailed description are merely exemplary and are intended to provide an overview or framework to understand the nature and character of the claims. Additional features and advantages will be set forth in the detailed description which follows, and in part will be readily apparent to those skilled in the art from the description or recognized by practicing the embodiments as described in the written description and claims hereof, as well as the appended drawings.

BRIEF DESCRIPTION OF THE DRAWINGS

The accompanying drawings are included to provide a further understanding, and are incorporated in and constitute a part of this specification. The drawings are illustrative of selected aspects of the present disclosure, and together with the description serve to explain principles and operation of methods, products, and compositions embraced by the present disclosure, in which.

DETAILED DESCRIPTION

Figure 1:
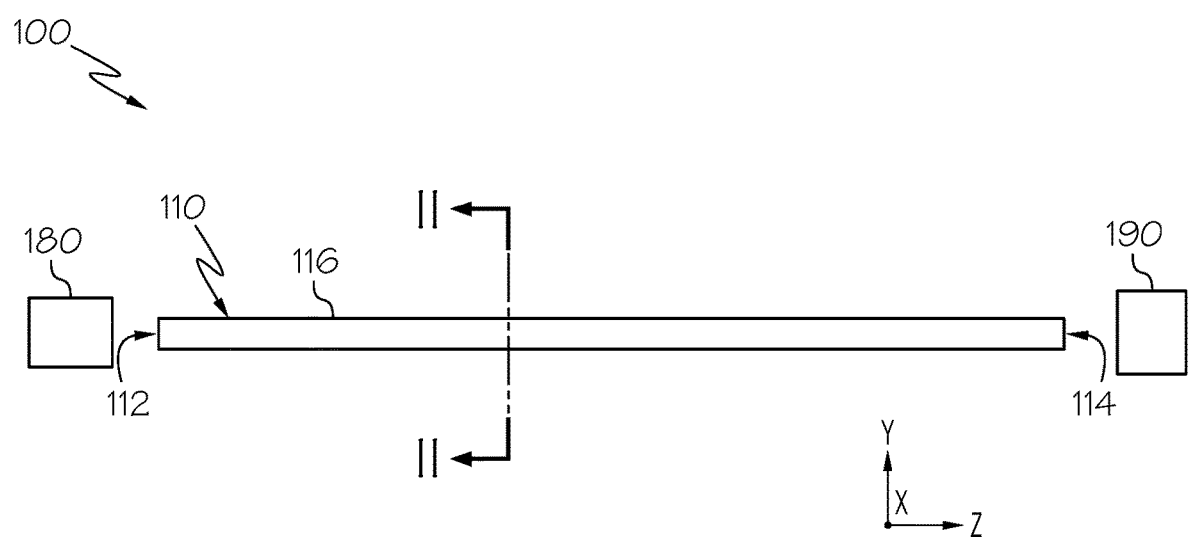
FIG. 1 schematically depicts an optical system including a signal source, a multicore optical fiber, and a photodetector, according to one or more embodiments shown and described herein.

Reference will now be made in detail to embodiments of multicore optical fibers examples of which are illustrated in the accompanying drawings. Whenever possible, the same reference numerals will be used throughout the drawings to refer to the same or like parts. One embodiment of a multicore optical fiber is shown in cross section in FIG. 1. The multicore optical fiber may include a plurality of core portions. Each of the plurality of core portions may include a central axis and a core region extending from the central axis to a radius $r_1$. The core region comprising a relative refractive index $\Delta_1$ relative to pure silica. An inner cladding region may encircle and directly contact the core region and extend from the radius $r_1$ to a radius $r_2$. The inner cladding region may have a relative refractive index $\Delta_2$ relative to pure silica. A depressed cladding region may encircle and directly contact the inner cladding region and extending from the radius $r_2$ to a radius $r_3$. The depressed cladding region may include a relative refractive index $\Delta_3$ relative to pure silica and a minimum relative refractive index $\Delta_3$ min relative to pure silica. In this embodiment, $\Delta_1 > \Delta_2 > \Delta_3$ min. The mode field diameter of each core portion at 1310 nm may be greater than or equal to 8.2 µm and less than or equal to 9.5 µm. The zero dispersion wavelength of each core portion is greater than or equal to 1300 nm and less than or equal to 1324 nm. Various embodiments of multicore optical fibers will be described herein in further detail with specific reference to the appended drawings.

In this specification and in the claims which follow, reference will be made to a number of terms which shall be defined to have the following meanings:

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

A multicore optical fiber, also referred to as a multicore optical fiber or "MCF", is considered for the purposes of the present disclosure to include two or more core portions disposed within a common cladding. Each core portion can be considered as having a higher index core region surrounded by a lower index inner cladding region. As used herein, the term "inner core portion" refers to the higher index core region. That is, a core portion may include an inner core portion and one or more lower index inner claddings.

"Radial position" and/or "radial distance," when used in reference to the radial coordinate "r" refers to radial position relative to the centerline (r=0) of each individual core portion in a multicore optical fiber. "Radial position" and/or "radial distance," when used in reference to the radial coordinate "R" refers to radial position relative to the centerline (R=0, central fiber axis) of the multicore optical fiber.

The length dimension "micrometer" may be referred to herein as micron (or microns) or μm.

The "refractive index profile" is the relationship between refractive index or relative refractive index and radial distance r from the core portion's centerline for each core portion of the multicore optical fiber. For relative refractive index profiles depicted herein as relatively sharp boundaries between various regions, normal variations in processing conditions may result in step boundaries at the interface of adjacent regions that are not sharp. It is to be understood that although boundaries of refractive index profiles may be depicted herein as step changes in refractive index, the boundaries in practice may be rounded or otherwise deviate from perfect step function characteristics. It is further understood that the value of the relative refractive index may vary with radial position within the core region and/or any of the cladding regions. When relative refractive index varies with radial position in a particular region of the fiber (core region and/or any of the cladding regions), it may be expressed in terms of its actual or approximate functional dependence or in terms of an average value applicable to the region. Unless otherwise specified, if the relative refractive index of a region (core region and/or any of the inner and/or common cladding regions) is expressed as a single value, it is understood that the relative refractive index in the region is constant, or approximately constant, and corresponds to the single value or that the single value represents an average value of a non-constant relative refractive index dependence with radial position in the region. Whether by design or a consequence of normal manufacturing variability, the dependence of relative refractive index on radial position may be sloped, curved, or otherwise non-constant.

The "relative refractive index" or "relative refractive index percent" as used herein with respect to multicore optical fibers and fiber cores of multicore optical fibers is defined according to equation (1):

$$\Delta\% = 100\frac{n^2(r) - n_c^2}{2n^2(r)} \quad (1)$$

where n(r) is the refractive index at the radial distance r from the core's centerline at a wavelength of 1550 nm, unless otherwise specified, and $n_c$ is 1.444, which is the refractive index of undoped silica glass at a wavelength of 1550 nm. As used herein, the relative refractive index is represented by Δ (or "delta") or Δ % (or "delta %") and its values are given in units of "%" or "% Δ", unless otherwise specified. Relative refractive index may also be expressed as Δ(r) or Δ(r) %. When the refractive index of a region is less than the reference index $n_c$, the relative refractive index is negative and can be referred to as a trench. When the refractive index of a region is greater than the reference index $n_c$, the relative refractive index is positive and the region can be said to be raised or to have a positive index.

The average relative refractive index of a region of the multicore optical fiber can be defined according to equation (2):

$$\Delta\% = \frac{\int_{r_{inner}}^{r_{outer}} \Delta(r)dr}{(r_{outer} - r_{inner})} \quad (2)$$

where $r_{inner}$ is the inner radius of the region, $r_{outer}$ is the outer radius of the region, and Δ(r) is the relative refractive index of the region.

The term "α-profile" (also referred to as an "alpha profile") refers to a relative refractive index profile Δ(r) that has the following functional form (3):

$$\Delta(r) = \Delta(r_0)\left\{1 - \left[\frac{|r - r_0|}{(r_1 - r_0)}\right]^\alpha\right\} \quad (3)$$

where $r_o$ is the point at which Δ(r) is maximum, $r_1$ is the point at which Δ(r) is zero, and r is in the range $r_i \leq r \leq r_f$, where $r_i$ is the initial point of the α-profile, $r_f$ is the final point of the α-profile, and α is a real number. In some embodiments, examples shown herein can have a core alpha of $1 \leq \alpha \leq 100$. In practice, an actual optical fiber, even when the target profile is an alpha profile, some level of deviation from the ideal configuration can occur. Therefore, the alpha parameter for an optical fiber may be obtained from a best fit of the measured index profile, as is known in the art.

The term "graded-index profile" refers to an α-profile, where α<10. The term "step-index profile" refers to an α-profile, where α≥10.

The "effective area" can be defined as (4):

$$A_{eff} = \frac{2\pi\left[\int_0^\infty (f(r))^2 r dr\right]^2}{\int_0^\infty (f(r))^4 r dr} \quad (4)$$

where f(r) is the transverse component of the electric field of the guided optical signal and r is radial position in the fiber. "Effective area" or "$A_{eff}$" depends on the wavelength of the optical signal. Specific indication of the wavelength will be made when referring to "Effective area" or "$A_{eff}$" herein.

Effective area is expressed herein in units of "μm²", "square micrometers", "square microns" or the like.

Unless otherwise noted herein, optical properties (such as dispersion, dispersion slope, etc.) are reported for the LP01 mode.

"Chromatic dispersion," herein referred to as "dispersion" unless otherwise noted, of an optical fiber is the sum of the material dispersion, the waveguide dispersion, and the inter-modal dispersion. "Material dispersion" refers to the manner in which the refractive index of the material used for the optical core affects the velocity at which different optical wavelengths propagate within the core. "Waveguide dispersion" refers to dispersion caused by the different refractive indices of the core and cladding of the optical fiber. In the case of single mode waveguide fibers, the inter-modal dispersion is zero. Dispersion values in a two-mode regime assume intermodal dispersion is zero. The zero dispersion wavelength ($\lambda_0$) is the wavelength at which the dispersion has a value of zero. Dispersion slope is the rate of change of dispersion with respect to wavelength. Dispersion and dispersion slope are reported herein at a wavelength of 1310 nm or 1550 nm, as noted, and are expressed in units of ps/nm/km and ps/nm²/km, respectively. Chromatic dispersion is measured as specified by the IEC 60793-1-42:2013 standard, "Optical fibres—Part 1-42: Measurement methods and test procedures—Chromatic dispersion."

The cutoff wavelength of an optical fiber is the minimum wavelength at which the optical fiber will support only one propagating mode. For wavelengths below the cutoff wavelength, multimode transmission may occur and an additional source of dispersion may arise to limit the fiber's information carrying capacity. Cutoff wavelength will be reported herein as a cable cutoff wavelength. The cable cutoff wavelength is based on a 22-meter cabled fiber length as specified in TIA-455-80: FOTP-80 IEC-60793-1-44 Optical Fibres—Part 1-44: Measurement Methods and Test Procedures—Cut-off Wavelength (21 May 2003), by Telecommunications Industry Association (TIA).

The bend resistance of an optical fiber, expressed as "bend loss" herein, can be gauged by induced attenuation under prescribed test conditions as specified by the IEC-60793-1-47:2017 standard, "Optical fibres—Part 1-47: Measurement methods and test procedures—Macrobending loss." For example, the test condition can entail deploying or wrapping the fiber one or more turns around a mandrel of a prescribed diameter, e.g., by wrapping 1 turn around either a 15 mm, 20 mm, or 30 mm or similar diameter mandrel (e.g. "1×15 mm diameter bend loss" or the "1×20 mm diameter bend loss" or the "1×30 mm diameter bend loss") and measuring the increase in attenuation per turn.

The term "attenuation," as used herein, is the loss of optical power as the signal travels along the optical fiber. Attenuation is measured as specified by the IEC 60793-1-40:2019 standard entitled "Optical fibres—Part 1-40: Attenuation measurement methods."

As used herein, the multicore optical fiber can include a plurality of core portions, wherein each core portion can be defined as an $i^{th}$ core portion (i.e., $1^{st}$, $2^{nd}$, $3^{rd}$, $4^{th}$, etc. . . . ). Each $i^{th}$ core portion can have an outer radius $r_{Ci}$. In embodiments, the outer radius $r_{Ci}$ of each core portion corresponds to an outer radius $r_3$ of a depressed cladding region of that core portion. Each $i^{th}$ core portion is disposed within a cladding matrix of the multicore optical fiber, which defines a common cladding of the multicore optical fiber. The common cladding includes a relative refractive index $\Delta_{CC}$ and an outer radius $R_{CC}$.

According to one aspect of the present disclosure, the core region forms the central portion of each core portion within the multicore optical fiber and is substantially cylindrical in shape. When two regions are directly adjacent to each other, the outer radius of the inner of the two regions coincides with the inner radius of the outer of the two regions. For example, in embodiments in which an inner cladding region surrounds and is directly adjacent to a core region, the outer radius of the core region coincides with the inner radius of the inner cladding region.

An "up-dopant" is a substance added to the glass of the component being studied that has a propensity to raise the refractive index relative to pure undoped silica. A "down-dopant" is a substance added to the glass of the component being studied that has a propensity to lower the refractive index relative to pure undoped silica. Examples of up-dopants include $GeO_2$ (germania), $Al_2O_3$, $P_2O_5$, $TiO_2$, Cl, Br, and alkali metal oxides, such as $K_2O$, $Na_2O$, $Li_2O$, $Cs_2O$, $Rb_2O$, and mixtures thereof. Examples of down-dopants include fluorine and boron.

The term "crosstalk" in a multi-core optical fiber is a measure of how much power leaks from one core portion to another, adjacent core portion. As used herein, the term "adjacent core portion" refers to the core that is nearest to the reference core portion. In embodiments, all core portions may be equally spaced from one another, meaning that all core portions are adjacent one another. In other embodiments, the core portions may not be equally spaced from one another, meaning that some core portions will be spaced further from the reference core portion than adjacent core portions are spaced from the reference core portion. The crosstalk can be determined based on the coupling coefficient, which depends on the refractive index profile design of the core portion, the distance between the two adjacent core portions, the structure of the cladding surrounding the two adjacent core portions, and $\Delta\beta$, which depends on a difference in propagation constant $\beta$ values between the two adjacent core portions (e.g., as described herein, two core portions having centerlines separated by a minimum core-to-core separation distance). For two adjacent core portions with power $P_1$ launched into the first core portion, then the power $P_2$ coupled from the first core portion to the second core portion can be determined from coupled mode theory using the following equation (5):

$$P_2 = \frac{L}{L_c}\left\{\left(\frac{\kappa}{g}\right)^2 \sin^2(g\Delta L)\right\}P_1 \tag{5}$$

where < > denotes the average, L is fiber length, κ is the coupling coefficient between the electric fields of the two cores, $\Delta L$ is the length of the fiber, $L_c$ is the correlation length, and g is given by the following equation (6):

$$g^2 = \kappa^2 + \left(\frac{\Delta\beta}{2}\right)^2 \tag{6}$$

where $\Delta\beta$ is the mismatch in propagation constants between the LP01 modes in the two adjacent core portions when they are isolated. The crosstalk (in dB) is then determined using the following equation (7):

$$X = 10\log\left(\frac{P_2}{P_1}\right) = 10\log\left(\frac{L}{L_c}\left\{\left(\frac{\kappa}{g}\right)^2 \sin^2(g\Delta L)\right\}\right) \tag{7}$$

The crosstalk between the two adjacent core portions increases linearly with fiber length in the linear scale (equation (5)) but does not increase linearly with fiber length in the dB scale (equation (7)). As used herein, crosstalk performance is referenced to a 100 km length L of optical fiber. However, crosstalk performance can also be represented with respect to alternative optical fiber lengths, with appropriate scaling. For optical fiber lengths other than 100 km, the crosstalk between cores can be determined using the following equation (8):

$$X(L) = X(100) + 10\log\left(\frac{L}{100}\right) \qquad (8)$$

For example, for a 10 km length of optical fiber, the crosstalk can be determined by adding "−10 dB" to the crosstalk value for a 100 km length optical fiber. For a 1 km length of optical fiber, the crosstalk can be determined by adding "−20 dB" to the crosstalk value for a 100 km length of optical fiber. For long-haul transmission in an uncoupled-core multicore fiber, the crosstalk should be less than or equal to −30 dB, less than or equal to −40 dB, or even less than or equal to −50 dB.

Techniques for determining crosstalk between cores in a multicore optical fiber can be found in M. Li, et al., "Coupled Mode Analysis of Crosstalk in Multicore fiber with Random Perturbations," in Optical Fiber Communication Conference, OSA Technical Digest (online), *Optical Society of America*, 2015, paper W2A.35, and Shoichiro Matsuo, et al., "Crosstalk behavior of cores in multi-core portion under bent condition," *IEICE Electronics Express*, Vol. 8, No. 6, p. 385-390, published Mar. 25, 2011 and Lukasz Szostkiewicz, et al., "Cross talk analysis in multi-core optical fibers by supermode theory," *Optics Letters*, Vol. 41, No. 16, p. 3759-3762, published Aug. 15, 2016, the contents of which are all incorporated herein by reference in their entirety.

The phrase "coupling coefficient" κ, as used herein, is related to the overlap of electric fields when the two cores are close to each other. The square of the coupling coefficient, $\kappa^2$, is related to the average power in core m as influenced by the power in other cores in the multicore optical fiber. The "coupling coefficient" can be estimated using the coupled power theory, with the methods disclosed in M. Koshiba, K. Saitoh, K. Takenaga, and S. Matsuo, "Analytical Expression of Average Power-Coupling Coefficients for Estimating Intercore Crosstalk in Multicore fibers," IEEE Photonics J., 4(5), 1987-95 (2012); and T. Hayashi, T. Sasaki, E. Sasaoka, K. Saitoh, and M. Koshiba, "Physical Interpretation of Intercore Crosstalk in Multicore fiber: Effects of Macrobend, Structure Fluctuation, and Microbend," Optics Express, 21(5), 5401-12 (2013), the contents of which are incorporated by reference herein in their entirety.

The mode field diameter (MFD) is measured using the Petermann II method and was determined from:

$$MFD = 2w \qquad (9)$$

$$w = \frac{\int_0^\infty (f(r))^2}{\int_0^\infty \left(\frac{df(r)}{dr}\right)^2 r dr} \qquad (10)$$

where f(r) is the transverse component of the electric field distribution of the guided light and r is the radial position in the fiber. Unless otherwise specified, "mode field diameter" or "MFD" refers to the mode field diameter at 1310 nm.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the term "substantially free," when used to describe the concentration and/or absence of a particular up-dopant or down-dopant in a particular portion of the fiber, means that the constituent component is not intentionally added to the fiber. However, the fiber may contain traces of the constituent component as a contaminant or tramp in amounts of less than 0.15 wt. %.

As used herein, the singular forms "a," "an" and "the" include plural referents unless the context clearly dictates otherwise. Thus, for example, reference to "a" component includes aspects having two or more such components, unless the context clearly indicates otherwise.

Multicore optical fibers are attractive for a number of optical fiber applications, including their use for increasing fiber density to overcome cable size limitations and duct congestion issues in passive optical network ("PON") systems. For example, multicore optical fibers are being considered for data center applications and high speed optical interconnects. In such applications, it is beneficial to increase the fiber density to maintain compactness of the multicore optical fiber (e.g., to provide a multicore optical fiber having a diameter to match the diameter of conventional optical fiber used for such applications, such as diameters of approximately 125 μm) while providing relatively high fiber counts as compared to conventional optical fibers used for such applications. Conventional approaches for achieving high fiber densities within such multimode optical fibers while reducing cross-talk between the cores of the multicore optical fiber have included reducing the mode field diameter of each core portion at 1310 nm to less than 8.0 μm. Such reduction in mode field diameter may reduce cross-talk between the core portions, but creates difficulties in coupling each core portion to a standard single mode fiber in optical interconnects, leading to signal losses.

The multimode optical fibers described herein address these deficiencies of conventional approaches to providing high fiber density in relatively small multicore optical fibers. In particular, by incorporating core portions comprising a core region, an inner cladding region, and a depressed cladding region with a trenched refractive index profile, the multimode optical fibers described herein provide relatively low cross-talk (e.g., less than −30 dB, less than −40 dB, or even less than −50 dB), low tunneling loss from corner fibers to the edge, and good bending performance. Additionally, the multimode optical fibers described herein achieve relatively large mode field diameters at 1310 nm (e.g., greater than or equal to 8.2 µm and less than or equal to 9.5 µm) for improved coupling to standard single mode fiber over conventional approaches.

Referring now to FIG. 1, an optical system 100 comprising an uncoupled-core multicore optical fiber 110 with a plurality of core portions $C_1$, $C_2$, $C_3$, and $C_4$ (FIG. 2), a signal source 180, and a photodetector 190 is schematically depicted. The signal source 180 may produce multiple modulated signals such as those produced by distributed feedback lasers (DFB) or vertical-cavity surface-emitting lasers (VCSEL). The uncoupled-core multicore optical fiber 110 comprises an input end 112 optically coupled to the signal source 180, an output end 114 optically coupled to the photodetector 190, and an outer surface 116. In operation, the signal source 180 may selectively direct photons from one laser into an individual core portion of the plurality of core portions $C_1$, $C_2$, $C_3$, and $C_4$. For example, the signal source 180, the input end 112 of the uncoupled-core multicore optical fiber 110, or both, may be coupled to a multicore fan-in device, which is configured to align the signal source 180 with any individual core portion of the plurality of core portions $C_1$, $C_2$, $C_3$, and $C_4$ (see FIG. 2).

Figure 2:
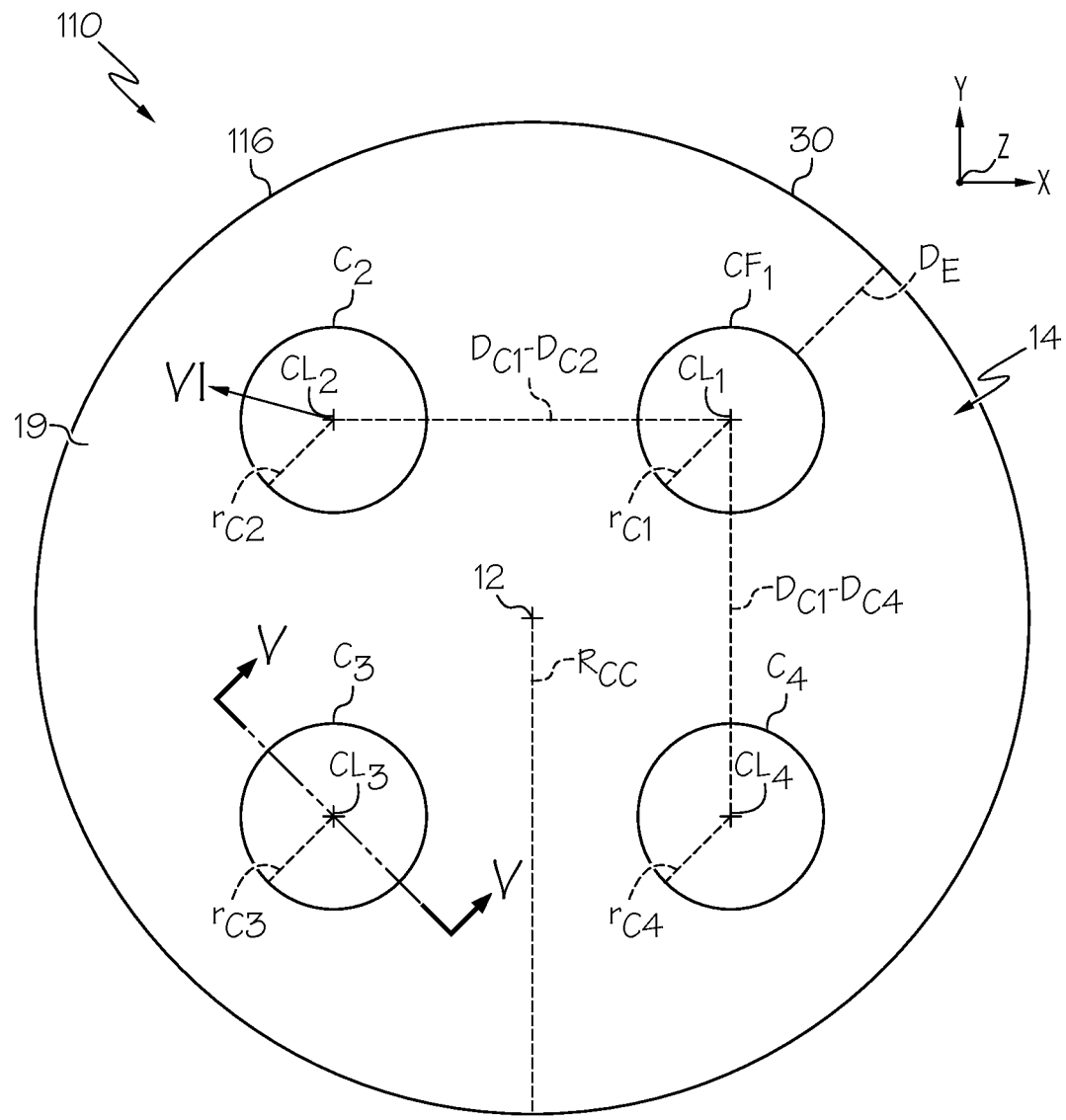
FIG. 2 schematically depicts a cross-section of the multicore optical fiber depicted in FIG. 1, according to one or more embodiments described herein.

FIG. 2 depicts a cross-sectional view of the uncoupled-core multicore optical fiber 110 along section II-II of FIG. 1. The uncoupled-core multicore optical fiber 110 includes a central fiber axis 12 (the centerline of the uncoupled-core multicore optical fiber 110, which defines radial position R=0) and a common cladding 19. The common cladding 19 can have an outer radius $R_{CC}$, which in the depicted embodiment of FIG. 2 corresponds to the outer radius of the uncoupled-core multicore optical fiber 110. A plurality of core portions $C_i$ (individually denoted $C_1$, $C_2$, $C_3$, and $C_4$ in the example of FIG. 2 and collectively referred to as core portions "C") are disposed within the common cladding 19, with each core portion $C_i$ generally extending through a length of the uncoupled-core multicore optical fiber 110 parallel to the central fiber axis 12.

In embodiments, $2*R_{CC}$ (e.g., the diameter of the multicore optical fiber 110) is equal to 125 microns. In embodiments, the diameter of the multicore optical fiber 110 is greater than 140 microns. In embodiments, the diameter of the multicore optical fiber 110 is greater than 170 microns. In embodiments, the diameter of the multicore optical fiber 110 is less than 200 microns. In embodiments, the diameter of the class fiber is less than 160 microns. In embodiments, the diameter of the multicore optical fiber 110 is greater than or equal to 120 and less than or equal to 130 microns.

Each core portion $C_1$, $C_2$, $C_3$, and $C_4$ includes a central axis or centerline $CL_1$, $CL_2$, $CL_3$ and $CL_4$ (which define radial position r=0 for each core portion) and an outer radius $r_{C1}$, $r_{C2}$, $r_{C3}$ and $r_{C4}$. A position of each of the centerlines $CL_1$, $CL_2$, $CL_3$ and $CL_4$ within the uncoupled-core multicore optical fiber 110 can be defined using Cartesian coordinates with the central fiber axis 12 defining the origin (0,0) of an x-y coordinate system coincident with the coordinate system defined by the radial coordinate R. The position of centerline $CL_1$ can be defined as $(x_1,y_1)$, the position of centerline $CL_2$ can be defined as $(x_2,y_2)$, the position of centerline $CL_3$ can be defined as $(x_3,y_3)$, and the position of centerline $CL_4$ can be defined as $(x_4,y_4)$. In embodiments, each of the core portions $C_i$ is separated from a nearest one (e.g., the core portion $C_i$ having a center line $CL_i$ that is closest to the centerline of that core portion) by a minimum core-to-core separation distance (or "minimum separation distance"). In embodiments, each of the core portions $C_i$ is separated from multiple core portions by the minimum separation distance. For example, as depicted in FIG. 2, the core portions $C_1$, $C_2$, $C_3$, and $C_4$ are arranged in a 2×2 arrangement with each of centerlines $CL_1$, $CL_2$, $CL_3$ and $CL_4$ being at the corner of a square. In such an arrangement, the centerlines $CL_1$ and $CL_2$ of the core portions $C_1$ and $C_2$ are separated by a minimum separation distance that can be defined as $D_{c1}-D_{c2}=\sqrt{[(x_2-x_1)^2+(y_2-y_1)^2]}$. The centerlines $CL_1$ and $CL_4$ of the core portions $C_1$ and $C_4$ are also separated by the minimum separation distance that can then be defined as $D_{c1}-D_{c4}=\sqrt{[(x_4-x_1)^2+(y_4-y_1)^2]}$. As used herein, the term "adjacent core portion" is used to denote core portions having centerlines that are most proximate to one another (i.e., there is no other core portion $C_i$ having a centerline $CL_i$ that is more proximate to a core portion than an adjacent core portion). In embodiments, centerlines of adjacent core portions are separated by the minimum separation distance. It should be understood that a particular core portion may have multiple adjacent core portions.

In embodiments, the minimum separation distance between the core portions $C_1$, $C_2$, $C_3$, and $C_4$ is greater than or equal to 35 microns to facilitate maintaining a relatively low cross-talk between the core portions $C_1$, $C_2$, $C_3$, and $C_4$. In embodiments, the minimum separation distance is greater than or equal to 40 microns. In embodiments, the minimum separation distance is greater than or equal to 45 microns (e.g. greater than or equal to 50 microns, greater than or equal to 60 microns, greater than or equal to 70 microns, greater than or equal to 75 microns).

In embodiments, edges of the plurality of core portions $C_i$ may also be spaced apart from the outer surface 116 of the uncoupled-core multicore optical fiber 110 by at least a minimum core edge to fiber edge distance $D_E$ as measured from the edge of each of the plurality of core portions $C_i$ to the outer surface 116. As depicted in FIG. 2, the minimum core edge to fiber edge distance $D_E$ is the minimum distance from a point along the outer circumference (e.g., a point on the outer circumference that is closest to the outer surface 116) of a core portion $C_i$ (e.g., corresponding to the $r_3$ value for the core portion $C_1$, as described herein with respect to FIG. 5) to a nearest point along the circumference of the outer surface 116, as determined by a line segment between the point along the outer circumference of the core portion $C_i$ and the nearest point along the circumference on the outer surface 15 in a plan perpendicular to the fiber axis 12. In embodiments, $D_E$ is greater than or equal 8 microns. In embodiments, $D_E$ is greater than or equal 12 microns. In embodiments, $D_E$ is greater than 15 microns. Without intending to be bound by any particular theory, it is believed that the extent of signal loss due to tunneling is dependent upon the minimum value for $D_E$.

In embodiments, the uncoupled-core multicore optical fiber 110 can have a circular cross-section shape. It should be understood that the multicore optical fiber 110 may comprise different numbers of core portions than those described with respect to FIGS. 1-2 and the arrangement of the core portions within the common cladding 19 (see FIG. 1) may vary. In embodiments, the uncoupled-core multicore optical fiber 110 can have N number of total core portions $C_i$, wherein i=1 . . . N and N is at least 3. According to one aspect of the present disclosure, the total number N of cores $C_i$ in the uncoupled-core multicore optical fiber 110 is from 3 to 12, 3 to 10, 3 to 8, 3 to 6, 3 to 5, or 3 to 4. For example, the total number N of core portions $C_i$ in the uncoupled-core multicore optical fiber 10 can be 3, 4, 5, 6, 7, 8, 9, 10, 11, 12, or any total number N of core portions $C_i$ between any of these values. The total number N of core portions $C_i$ can be even or odd and can be arranged in any pattern within the common cladding 19, non-limiting examples of which include a 2×2 pattern (or multiples thereof, such as a 2×4 pattern), a rectangular pattern, a square pattern, a rectangular pattern, a circular pattern, and a hexagonal lattice pattern.

Figure 3:
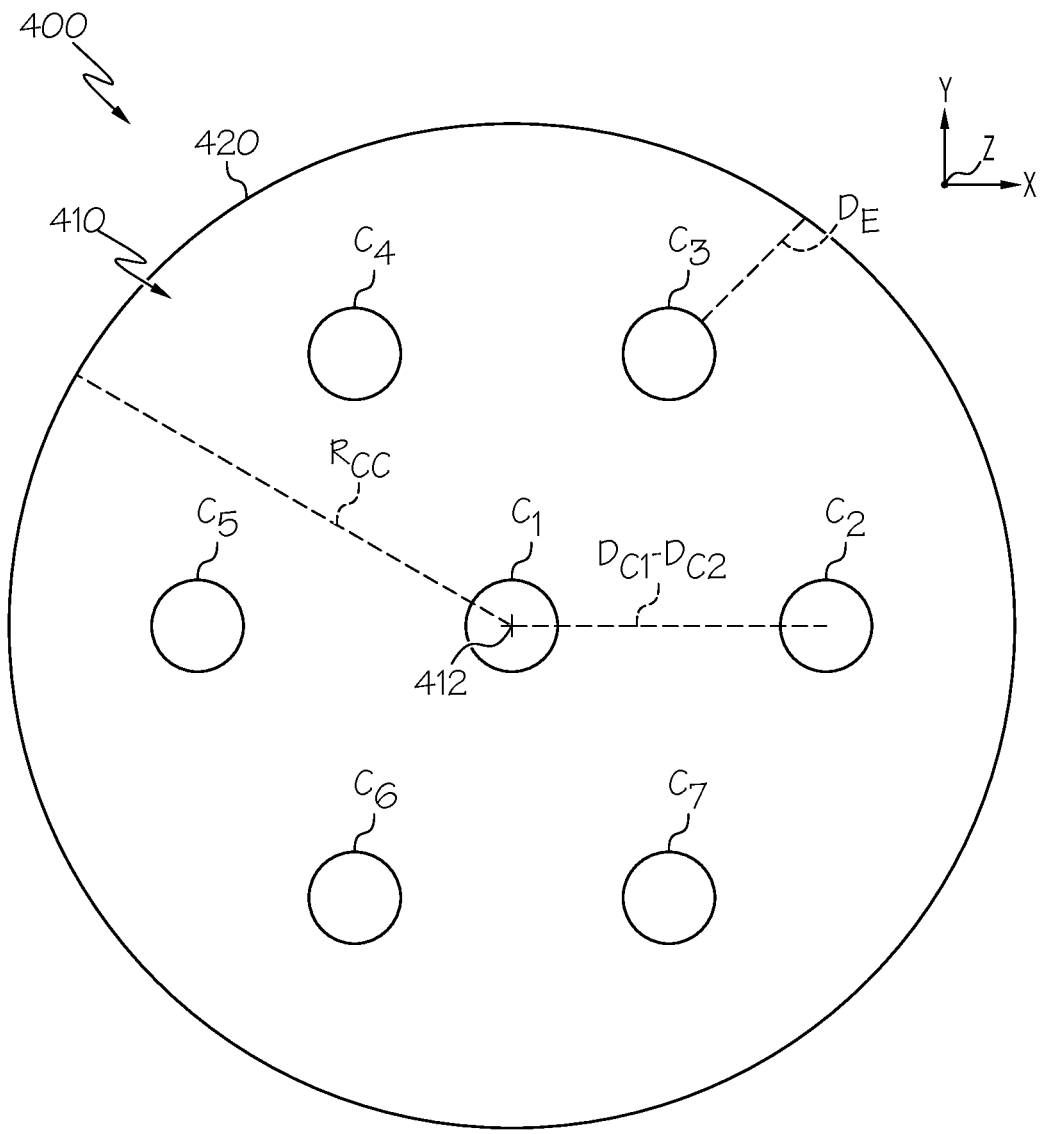
FIG. 3 schematically depicts a cross-section of a multicore optical fiber, according to one or more embodiments described herein.

For example, FIG. 3 depicts a cross-sectional view of an uncoupled-core multicore optical fiber 400 having N=7 core portions $C_i$ arranged in a hexagonal lattice pattern. In embodiments, the uncoupled-core multicore optical fiber 400 may be used in place of the uncoupled-core multicore optical fiber 110 described with respect to FIG. 1. The uncoupled-core multicore optical fiber 400 includes a first core portion $C_1$ extending through a central axis 412 of the uncoupled-core multicore optical fiber 400. Six additional core portions $C_2$, $C_3$, $C_4$, $C_5$, $C_6$, and $C_7$ are disposed in a cladding matrix 410 equidistantly from the first core portion $C_1$ in a hexagonal arrangement. In embodiments, triplets of the core portions including the first core portion $C_1$ and two of the additional core portions $C_2$, $C_3$, $C_4$, $C_5$, $C_6$, and $C_7$ form equilateral triangles with the centerlines of the core portions in each triplet separated by a minimum separation distance equal to $D_{C1}$-$D_{C2}$. In embodiments, the minimum separation distance $D_{C1}$-$D_{C2}$ is greater than or equal to 35 microns to facilitate maintaining relatively low cross-talk between the core portions $C_1$, $C_2$, $C_3$, and $C_4$. In embodiments, the minimum separation distance is greater than or equal 40 microns. In embodiments, the minimum separation distance $D_{C1}$-$D_{C2}$ is greater than or equal to 45 microns. In embodiments, the arrangement of core portions is centered within the cladding matrix 410 such that each of the additional core portions $C_2$, $C_3$, $C_4$, $C_5$, $C_6$, and $C_7$ is separated from an outer surface 420 of the cladding matrix 410 by at least a minimum core edge to fiber edge distance $D_E$. In embodiments, $D_E$ is greater than or equal 8 microns. In embodiments, $D_E$ is greater than or equal 12 microns. In embodiments, $D_E$ is greater than 15 microns.

Figure 4:
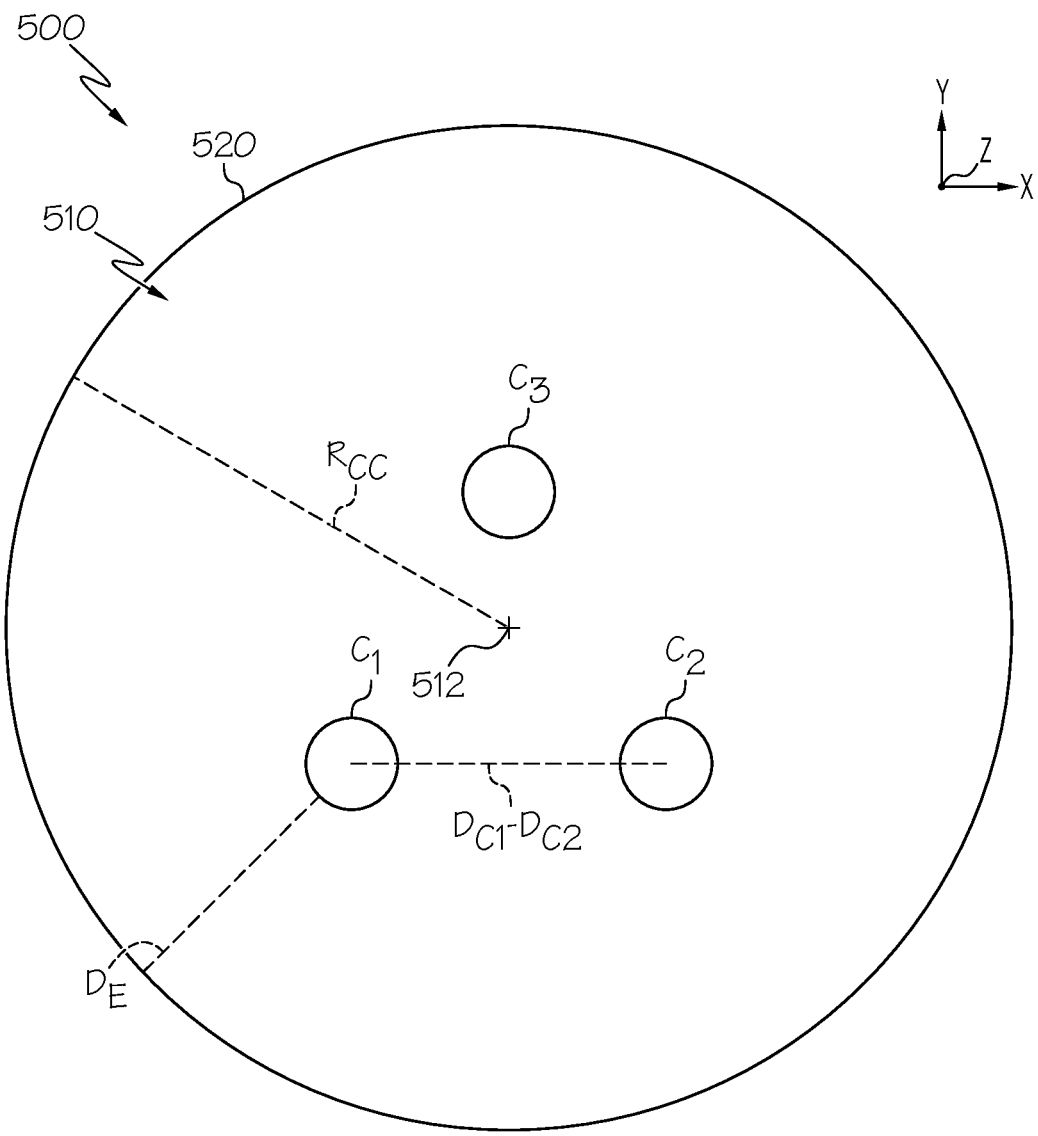
FIG. 4 schematically depicts a cross-section of a multicore optical fiber, according to one or more embodiments described herein.

FIG. 4 depicts a cross-sectional view of an uncoupled-core multicore optical fiber 500 having N=3 core portions $C_i$ arranged in a triangular pattern around a central axis 512. In embodiments, the uncoupled-core multicore optical fiber 500 may be used in place of the uncoupled-core multicore optical fiber 110 described with respect to FIG. 1. The uncoupled-core multicore optical fiber 500 includes core portions $C_1$, $C_2$, $C_3$ disposed in a cladding matrix 510. In embodiments, the core portions $C_1$, $C_2$, $C_3$ form an equilateral triangle with the centerlines of the core portions in each triplet separated by a separation distance equal to $D_{C1}$-$D_{C2}$. In embodiments, the core portions $C_1$, $C_2$, and $C_3$ are not evenly spaced (e.g., a centerline of the first core portion $C_i$ may be separated from the second core portion $C_2$ by a first distance, and the second core portion $C_2$ may be separated from the third core portion $C_3$ by a second difference that is different from the first distance). In embodiments, the $D_{C1}$-$D_{C2}$ is greater than the minimum separation distance described herein. To facilitate maintaining relatively low cross-talk between the core portions $C_1$, $C_2$, and $C_3$. In embodiments, the minimum separation distance is greater than or equal 35 microns or greater than or equal to 40 microns. In embodiments, the minimum separation distance $D_{C1}$-$D_{C2}$ is greater than or equal to 45 microns. In embodiments, each of the core portions core portions $C_1$, $C_2$, $C_3$ is separated from an outer surface 520 of the cladding matrix 410 by at least a minimum core edge to fiber edge distance $D_E$. In embodiments, $D_E$ is greater than or equal 8 microns.

In embodiments, $D_E$ is greater than or equal 12 microns. In embodiments, $D_E$ is greater than 15 microns.

It should be appreciated that various numbers and arrangements of core portions for the uncoupled-core multicore optical fiber 110 are contemplated and possible. For example, in embodiments, the uncoupled-core multicore optical fiber 110 can have N=12 core portions $C_i$ arranged in a circular pattern. In embodiments, the uncoupled-core multicore optical fiber 110 can have a core portion $C_i$ positioned such that the core centerline $CL_i$ aligns with the central fiber axis 12. In embodiments, the uncoupled-core multicore optical fiber 110 can have a core portion $C_i$ pattern such that the cores $C_i$ are spaced around the central fiber axis 12.

Figure 5:
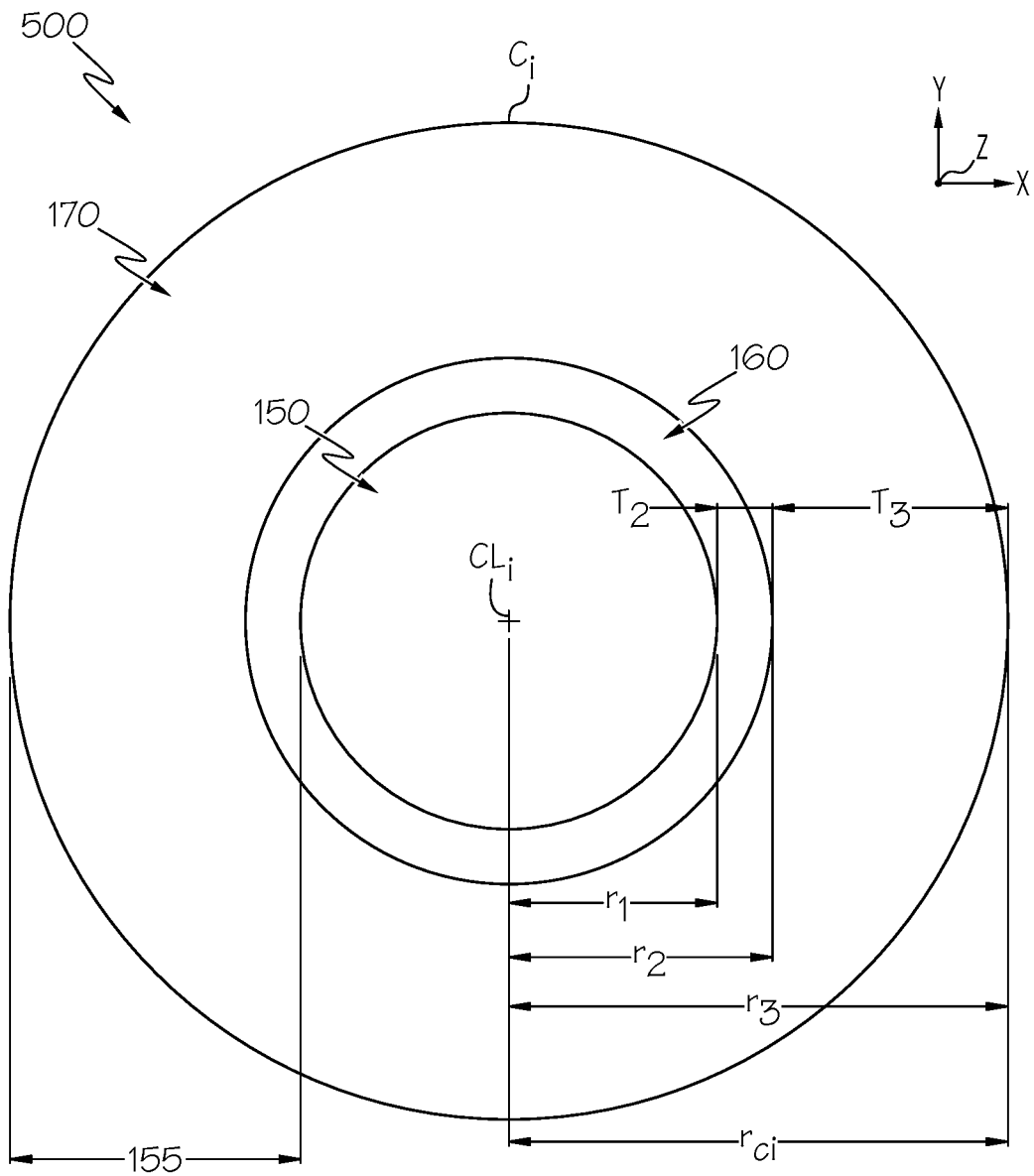
FIG. 5 schematically depicts a cross-section of a core portion of a multicore optical fiber comprising a core region, an inner cladding region, and a depressed cladding region, according to one or more embodiments described herein.

FIG. 5 schematically depicts a cross sectional view of one of the core portions $C_i$ described herein with respect to FIGS. 1-2 along the line V-V of FIG. 2. In embodiments, each of the core portions $C_i$ comprise a core region 150 centered on a centerline $CL_i$ and a cladding region 155. The cladding region 155 comprises an inner cladding region 160 (also referred to herein as an inner cladding layer) encircling and directly contacting the core region 150 and a depressed cladding region 170 encircling and directly contacting the inner cladding region 160. In embodiments, the core region 150 and the cladding region 155 are concentric such that the cross section of the core portion $C_i$ is generally circular symmetric with respect to the centerline $CL_i$ having an overall radius $r_{Ci}$. The core region 150 has a radius $r_1$ and the depressed cladding region 170 has a radius $r_3$ that defines an outer radius of the core portion $C_i$ such that $r_3$ corresponds to the radius $r_{Ci}$ associated with each core portion $C_i$ described herein with respect to FIG. 2. The inner cladding region 160 extends between the radius $r_1$ of the core region 150 and an inner radius $r_2$ of the depressed cladding region 170 such that the inner cladding region 160 has a thickness $T_2=r_2-r_1$ in the radial direction. The depressed cladding region 170 has a thickness $T_3=r_3-r_2$ in the radial direction. The structure, compositions, and optical properties of each of the core region 150, the inner cladding region 160, and the depressed cladding region 170 are described in greater detail herein.

Figure 6:
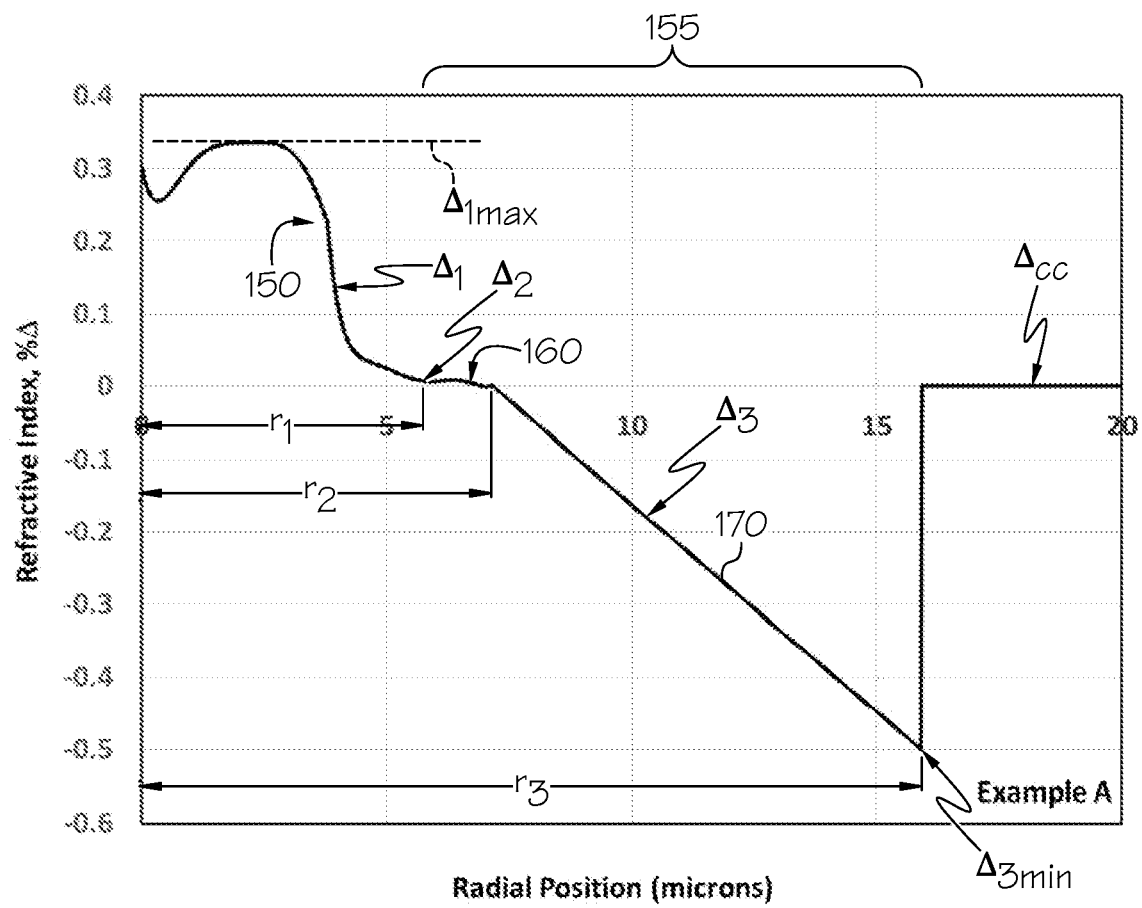
FIG. 6 graphically depicts a relative refractive index profile of a core portion and common cladding, according to one or more embodiments described herein.

Referring to FIGS. 5 and 6, a radial cross section of one embodiment of one of the core portions $C_i$ (FIG. 5) and corresponding relative refractive index profile (FIG. 6) of the core portion $C_i$ along the line VI in FIG. 2 are schematically depicted. In FIG. 6, the relative refractive index profile of the core portion $C_i$ is plotted as a function of radial distance r from the centerline $CL_i$ of the core portion $C_i$. As depicted in FIG. 2, the relative refractive index profile depicted in FIG. 6 extends radially outward from a centerline $CL_i$ of the core portion Ci and into a portion of the common cladding 19. As depicted in FIG. 6, the core region 150 has a relative refractive index $\Delta_1$. In embodiments, the relative refractive index $\Delta_1$ may vary with radial coordinate (radius) r and be represented as $\Delta_1(r)$. In embodiments, the core region 150 comprises silica-based glass having an up-dopant (e.g., germanium). In embodiments, the relative refractive index $\Delta_1(r)$ includes a maximum relative refractive index $\Delta_{1\,max}$ (relative to pure silica). In embodiments, $\Delta_{1\,max}$ is greater than or equal 0.28% $\Delta$ and less than or equal to 0.45% $\Delta$. In embodiments, to achieve these values for $\Delta_{1\,max}$, the core region 150 possesses an up-dopant (e.g., germanium) concentration of greater than or equal to 6 wt. % and less than or equal to 9 wt. %. The up-dopant concentration may vary within the core region 150. Providing a core portion $C_i$ with a $\Delta_{1\,max}$ value within this range facilitates each core portion $C_i$ having a mode field diameter at 1310 nm greater than or equal to 8.2 µm and less than or equal to 9.5 µm.

In embodiments, the relative refractive index $\Delta_1(r)$ follows a graded index profile, with an α value of greater than or equal to 1.5 and less than or equal to 5.0. For example, in embodiments, the maximum relative refractive index $\Delta_{1\ max}$ may occur at r=0 (e.g., at the centerline $CL_i$) and decrease with an alpha profile until reaching a radius $r_1$. In embodiments, the relative refractive index $\Delta_1(r)$ follows a step index profile, with an α value of greater than or equal to 10. For example, in embodiments, relative refractive index $\Delta_1(r)$ may remain substantially equal to the maximum relative refractive index $\Delta_{1\ max}$ until the radius $r_1$. In embodiments, the radius $r_1$ coincides with an inner radius of inner cladding region 160. In embodiments, the core radius $r_1$ is greater than or equal to 3.0 microns and less than or equal to 7.0 microns. In embodiments, the core radius $r_1$ is greater than or equal to 3.5 microns and less than or equal to 6.5 microns (e.g., greater than or equal to 4.0 microns and less than or equal to 6.0 microns). Providing a core radius $r_1$ within this range facilitates each core portion $C_1$ having a mode field diameter at 1310 nm greater than or equal to 8.2 µm and less than or equal to 9.5 µm.

Referring still to FIGS. 5 and 6, the inner cladding region 160 extends from radius $r_1$ to a radius $r_2$ such that the inner cladding has a radial thickness $T_2=r_2-r_1$. In embodiments, the inner cladding region 160 comprises a relative refractive index $\Delta_2$. In embodiments, the inner cladding region 160 is formed from silica-based glass that is substantially free of dopants (e.g., up-dopants and down-dopants) such that the relative refractive index $\Delta_2$ is approximately 0. In embodiments, the inner cladding region 160 is formed from a similar silica-based glass as the common cladding 19 such that $42=\Delta_{CC}$. Without wishing to be bound by theory, it is believed that the value of $r_2$ (and hence the radial thickness $T_2$ of the inner cladding region 160) in part determines the zero dispersion wavelength of each of the core portions $C_i$. In embodiments, each of the core portions $C_i$ has a zero dispersion wavelength of greater than or equal 1300 nm and less than or equal to 1324 nm. To achieve such a zero dispersion wavelength, $r_2$ may be greater than or equal to 4.5 µm and less than or equal to 17 µm. In embodiments, $r_2$ is greater than or equal 7.0 µm and less than or equal 7.5 µm.

The depressed cladding region 170 extends from the radius $r_2$ to the radius $r_3$ such that the outer cladding has a radial thickness $T_3=r_3-r_2$. The radius $r_3$ may correspond to the outer radius $r_{Ci}$ of the radius of a core portion $C_i$ described herein with respect to FIG. 2. In embodiments, each core portion $C_i$ has an outer diameter $d=2*r_3$. Without wishing to be bound by theory, it is believed that the value of $r_3$ (and hence the radial thickness $T_3$ of the depressed cladding region 170) in part determines a zero dispersion wavelength of each of the core portions $C_i$. In embodiments, each of the core portions $C_i$ has a zero dispersion wavelength of greater than or equal 1300 nm and less than or equal to 1324 nm, as noted herein. To achieve such a zero dispersion wavelength, $r_3$ may be greater than or equal to 11 µm and less than or equal to 20 µm. In embodiments, $r_3$ may be greater than or equal to 12 µm and less than or equal to 18 µm. In embodiments, $r_3$ may be greater than or equal to 14.5 µm and less than or equal to 16 µm.

Figure 7:
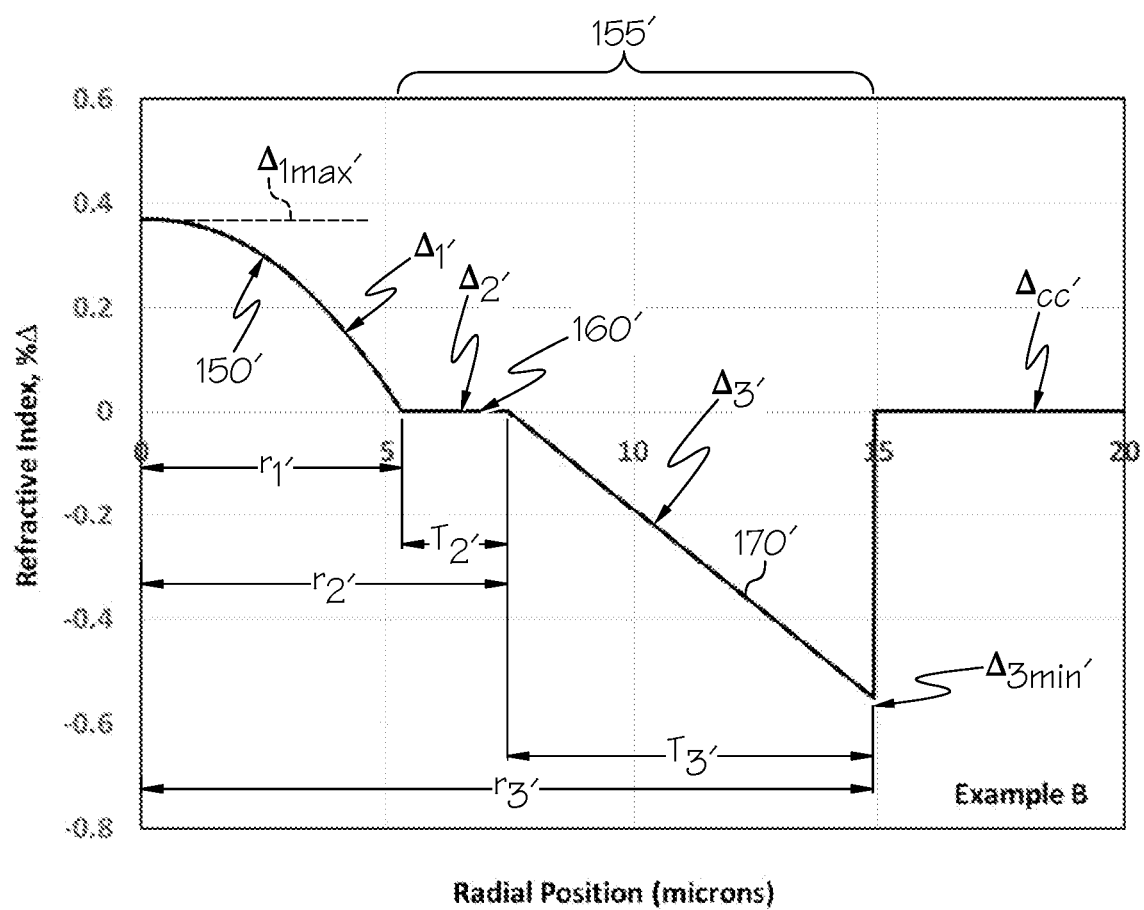
FIG. 7 graphically depicts a relative refractive index profile of a core portion and common cladding, according to one or more embodiments described herein.

The depressed cladding region 170 has a relative refractive index $\Delta_3$. In embodiments, the relative refractive index $\Delta_3$ is less than or equal to the relative refractive index $\Delta_2$ of the inner cladding region 160 throughout the depressed cladding region 170. The relative refractive index $\Delta_3$ may also be less than or equal to the relative refractive index $\Delta_{CC}$ of the common cladding 19 (see FIG. 2) such that the depressed cladding region 170 forms a trench in the relative refractive index profile of the core portion $C_i$. The term "trench," as used herein, refers to a region of the core portion that is, in radial cross section, surrounded by regions of the multicore fiber (e.g., the inner cladding region 160 and the common cladding 19) having relatively higher refractive indexes. In embodiments, the relative refractive index $\Delta_3$ may be constant throughout the depressed cladding region 170. In other embodiments, the relative refractive index $\Delta_3$ may vary with radial coordinate r (radius) and be represented as $\Delta_3(r)$. In embodiments, the relative refractive index $\Delta_3(r)$ within the depressed cladding region 170 decreases monotonically with increasing radial distance from the centerline $CL_i$ such that the depressed cladding region 170 comprises a minimum relative refractive index 43 min at the $r_3$. In embodiments, $\Delta_3(r)$ decreases at a constant rate with radial distance from the centerline $CL_i$ such that the relative refractive index profile within the depressed cladding region 170 is substantially linear. In embodiments, the relative refractive index $\Delta_3(r)$ continuously decreases with increasing radial distance from the centerline $CL_i$ at an increasing or decreasing rate such that the relative refractive index profile within the depressed cladding region 170 has a parabolic or similar shape that is either concave or convex. Referring still to FIGS. 5-6, in embodiments $\Delta_1 > \Delta_2 > \Delta_3$ mm. In embodiments, $\Delta_2 \geq \Delta_3$ such that the depressed cladding region forms a depressed-index trench in a relative refractive index profile of each core portion between $r_2$ and $r_3$ Referring still to FIGS. 5 and 6, in embodiments, the depressed cladding region 170 comprises silica glass having one or more down-dopants (e.g., fluorine). In embodiments, the down-dopant concentration within the depressed cladding region 170 varies as a function of radial distance from the centerline $CL_1$ of the core portion $C_i$. For example, in embodiments, the down-dopant concentration varies within the depressed cladding region 170 by increasing monotonically from, for example, a minimum value of 0 wt. % at the radial position $r_2$ to a maximum value at the radial position $r_3$. In embodiments, the maximum value of the down-dopant concentration is greater than or equal to 1.2 wt. % and less than or equal to 2.0 wt. %. In embodiments, the maximum fluorine concentration $F_{max}$ is greater than or equal to 1.2 wt. % and less than or equal to 1.8 wt. %. In accordance with the down-dopant concentration within the depressed cladding region 170, the relative refractive index $\Delta_3(r)$ may decrease monotonically with increasing radial distance from the centerline $CL_i$ of the core portion $C_i$ such that the depressed cladding region 170 forms a triangular-shaped trench in the refractive index profile as depicted in FIGS. 6 and 7. Such embodiments are beneficial in that they may be formed using the single-step process described further herein with respect to FIGS. 8 and 9. In embodiments, $\Delta_3$ min is less than or equal −0.2% Δ and greater than or equal to −0.6% Δ.

The radial thickness of a particular glass portion of a core portion $C_i$ may be interrelated with a relative refractive index of the particular glass portion. Specifically, a glass portion 'i' with a relative refractive index $\Delta_i$ %, an inner radius $r_{in}$ and an outer radius $r_{out}$ may have a trench volume $V_i$ defined as:

$$V_i = 2\int_{r_{in}}^{r_{out}} \Delta i\ \%\ (R) dR \qquad (11)$$

which may be rewritten as:

$$V_i = \Delta_i\ \%\ (r_{out}^2 - r_{in}^2) \qquad (12)$$

Accordingly, the depressed cladding region 170 may have a trench volume $V_T$ of:

$$V_T = \Delta_3\% \, (r_3^2 - r_2^2) \tag{13}$$

In embodiments, the depressed cladding region 170 is constructed to have a down-dopant concentration to achieve a trench volume $V_T$ within each core portion $C_i$ that is greater than or equal to 30% $\Delta$ $\mu m^2$ and less than 75% $\Delta$ $\mu m^2$. Without wishing to be bound by theory, it is believed that the trench volume $V_T$ within the depressed cladding region 170 is determinative of the zero dispersion wavelength and the mode field diameter of each core portion $C_i$. Providing a trench volume $V_T$ may provide core portions $C_i$ having zero dispersion wavelengths greater than or equal to 1300 nm and less than or equal 1324 nm, and mode field diameters (at 1310 nm) greater than or equal to 8.2 $\mu m$ and less than or equal to 9.5 $\mu m$. Without wishing to be bound by theory, it is believed that larger trench volumes $V_T$ tend to confine the light travelling through each core portion $C_i$ and make the mode field diameter of each core portion $C_i$ smaller. In embodiments, if the trench volume is greater than 75% $\Delta$ $\mu m^2$, the mode field diameter tends to be lower than 8.2 $\mu m$, rendering coupling with a standard single mode fiber more difficult or have cable cutoff larger than 1260 nm making the fiber not suitable for operation at 1310 nm wavelength or in the O-band. It is also believed that the radial starting point of the depressed cladding region 170 (e.g., $r_2$ in the depicted embodiments) is also determinative of the mode field diameter of each core portion $C_i$. Relatively large $r_2$ values reduce the tendency of the depressed cladding region to confine light propagating through each core portion $C_i$. In embodiments, core portions $C_i$ having relatively large $r_3$ values (e.g., greater than or equal to 15 $\mu m$) may comprise trench volumes greater than or equal to 75% $\Delta$ $\mu m^2$. Providing a trench volume $V_T$ within such a range may also improve the bend performance of each core portion $C_i$ over multicore fibers not including the depressed cladding region 170.

FIG. 7 schematically depicts another relative refractive index profile for the core portions $C_i$ of the multicore optical fiber 110 described herein with respect to FIGS. 1-2. In embodiments, the core portion relative refractive index profile depicted in FIG. 7 also extends along the line VI shown in FIG. 2 from the centerline $CL_i$ of the core portion $C_i$ into the common cladding 19. The core portions $C_i$ may include similar structural components as described with respect to FIGS. 5 and 6. As such, in embodiments in accordance with FIG. 7 each of the core portions $C_i$ comprise a core region 150' and a cladding region 155'. The cladding region 155' comprises an inner cladding region 160' encircling and directly contacting the core region 150' and a depressed cladding region 170' encircling and directly contacting the inner cladding region 160'. The core region 150' has a radius $r_{1'}$, and the depressed cladding region 170' has a radius $r_{3'}$ that defines an outer radius of the core portion $C_i$ such that $r_{3'}$ corresponds to the radius $r_{Ci}$ associated with each core portion $C_i$ described herein with respect to FIG. 2. The inner cladding region 160' extends between the radius $r_{1'}$ of the core region 150' and an inner radius $r_{2'}$ of the depressed cladding region 170' such that the inner cladding region 160 has a thickness $T_{2'} = r_{2'} - r_{1'}$ in the radial direction. The depressed cladding region 170' has a thickness $T_{3'} = r_{3'} - r_{2'}$ in the radial direction.

Each of the core region 150', the inner cladding region 160', and the depressed cladding region 170' may have structural and compositional properties that are generally similar to those described herein with respect to the core region 150, the inner cladding region 160, and the depressed cladding region 170 described herein with respect to FIGS. 5 and 6. As depicted, the core region 150' depicted in FIG. 7 differs from the core region 150 described with respect to FIGS. 5 and 6 in that the relative refractive index $\Delta_{1'}(r)$ follows a graded index profile having a lower alpha value (e.g., less than 2.5) than the alpha value of the relative refractive index $\Delta_1(r)$ of the core region 150 depicted in FIG. 6, which has an alpha value of greater than 10. The radius $r_{1'}$ of the core region 150' is greater than the radius $r_1$ of the core region 150 depicted in FIG. 6, such that the thickness $T_{2'}$ of the inner cladding region 160' is smaller than the thickness $T_2$ of the inner cladding region 160 depicted in FIG. 6. The minimum relative refractive index $\Delta_{3\,min'}$ of the depressed cladding region 170' depicted in FIG. 7 is less than the minimum relative refractive index $\Delta_{3\,min}$ of the depressed cladding region 170 described herein with respect to FIGS. 5-6, and $r_{3'}$ of the depressed cladding region 170' is reduced relative to the $r_3$ of the depressed cladding region 170 such that the depressed cladding region 170' defines a slightly smaller trench volume. The relative refractive index profile depicted in FIG. 6 achieved slightly better bend loss performance over core fibers $C_i$ constructed in accordance with the relative refractive index profile depicted in FIG. 7. The performance of the relative refractive profiles depicted in FIGS. 6 and 7, as well as specific values associated therewith, are described in greater detail in the Examples section contained herein.

In embodiments, the cross talk between each core portion $C_i$ and an adjacent core portion $C_j$ is less than or equal to −30 dB. The cross talk depends on the design of the core portions (e.g., the relative refractive index profiles) and the distance between adjacent core portions (e.g., the minimum separation distance described herein). In embodiments, the cross-talk is determined in accordance with equations 5-8 herein. In embodiments, the cross-talk between each core portion and an adjacent core portion is less than or equal to −35 dB. In embodiments, the cross-talk between each core portion and an adjacent core portion is less than or equal to −40 dB.

In embodiments, each core portion $C_i$ of the uncoupled-core multicore optical fiber 110 may have an effective area $A_{eff}$ of greater than 62 $\mu m^2$ and less than or equal to 72 $\mu m^2$ at a wavelength of 1310 nm. The effective area is determined individually for each core portion $C_i$ of the uncoupled-core multicore optical fiber 110 without consideration of the effects of crosstalk between the core portions $C_i$ of the uncoupled-core multicore optical fiber 110.

The average attenuation of the uncoupled-core multicore optical fiber 110 is determined by measuring the attenuation for each core portion $C_i$ of the uncoupled-core multicore optical fiber 110 at a wavelength of 1310 nm or 1550 nm and then calculating an average attenuation for the entire uncoupled-core multicore optical fiber 110 based on the individual attenuation measurements of each core portion $C_i$. In embodiments, the average attenuation at 1310 nm of the uncoupled-core multicore optical fiber 110 is less than or equal to 0.34 dB/km (e.g., less than or equal to 0.33 dB/km, less than or equal to 0.32 dB/km). In embodiments, the average attenuation at 1550 nm of the uncoupled-core multicore optical fiber 110 is less than 0.19 dB/km (e.g., less than or equal to 0.185 dB/km, less than or equal to 0.18 dB/km). It should be understood that the attenuation of the uncoupled-core multicore optical fiber 110 may be within a range formed from any one of the lower bounds for attenuation and any one of the upper bounds of attenuation described herein.

In various embodiments, the cable cutoff of each core portion $C_i$ of the uncoupled-core multicore optical fiber 110 is greater than or equal to 1100 nm and less than or equal to 1260 nm (e.g., greater than or equal to 1150 nm and less than or equal to 1260 nm). In embodiments, the cable cutoff of each core portion $C_i$ of the uncoupled-core multicore optical fiber 110 is greater than or equal to 1200 nm and less than or equal to 1260 nm. It should be understood that the cable cutoff of each core portion $C_i$ of the uncoupled-core multicore optical fiber 110 may be within a range formed from any one of the lower bounds for cable cutoff and any one of the upper bounds of cable cutoff described herein.

The average 15 mm bend loss of the uncoupled-core multicore optical fiber is determined by measuring the 15 mm bend loss for each core portion $C_i$ of the uncoupled-core multicore optical fiber 110 at a wavelength of 1510 nm and then calculating an average 15 mm bend loss for the entire uncoupled-core multicore optical fiber based on the individual 15 mm bend loss measurements of each core portion $C_i$. In embodiments, the average bend loss of the uncoupled-core multicore optical fiber 110 measured at a wavelength of 1550 nm using a mandrel with a 15 mm diameter ("1×15 mm diameter bend loss") is less than or equal to 0.5 dB/turn or less than or equal to 0.25 dB/turn.

The average 20 mm bend loss of the uncoupled-core multicore optical fiber is determined by measuring the 20 mm bend loss for each core portion $C_i$ of the uncoupled-core multicore optical fiber 110 at a wavelength of 1510 nm and then calculating an average 20 mm bend loss for the entire uncoupled-core multicore optical fiber 110 based on the individual 20 mm bend loss measurements of each core portion $C_i$. In embodiments, the average bend loss of the uncoupled-core multicore optical fiber 110 at a wavelength of 1550 nm using a mandrel with a 20 mm diameter ("1×20 bend loss") is less than or equal to 0.1 dB/turn or less than or equal to 0.005 dB/turn.

The average 30 mm bend loss of the uncoupled-core multicore optical fiber 110 is determined by measuring the 30 mm bend loss for each core portion $C_i$ of the uncoupled-core multicore optical fiber 110 at a wavelength of 1510 nm and then calculating an average 30 mm bend loss for the entire uncoupled-core multicore optical fiber 110 based on the individual 30 mm bend loss measurements of each core portion $C_i$. In embodiments, the average bend loss at 1550 nm of the uncoupled-core multicore optical fiber 110 at a wavelength of 1550 nm using a mandrel with a 30 mm diameter ("1×30 bend loss") is less than or equal to 0.005 dB/turn, or less than 0.003 dB/turn or less than or equal to 0.0025 dB/turn.

In various embodiments, the zero dispersion wavelength of each core portion $C_i$ of the uncoupled-core multicore optical fiber 110 is greater than or equal to 1300 nm and less than or equal to 1324 nm. In embodiments, the zero dispersion wavelength of each core portion $C_i$ is greater than or equal to 1308 and less than or equal to 1322. In embodiments, the zero dispersion wavelength of each core portion $C_i$ is greater than or equal to 1310 and less than or equal to 1318. It should be understood that the zero dispersion wavelength of each core portion $C_i$ of the uncoupled-core multicore optical fiber 110 may be within a range formed from any one of the lower bounds for zero dispersion wavelength and any one of the upper bounds of zero dispersion wavelength described herein.

In various embodiments, dispersion at 1310 nm of each core portion $C_i$ of the uncoupled-core multicore optical fiber 110 is greater than or equal to −1.3 ps/nm/km and less than or equal to 1 ps/nm/km. It should be understood that the dispersion at 1310 nm of each core portion $C_i$ of the uncoupled-core multicore optical fiber 110 may be within a range formed from any one of the lower bounds for dispersion at 1310 nm and any one of the upper bounds of dispersion at 1310 nm described herein.

In various embodiments, the dispersion slope at 1310 nm of each core portion $C_i$ of the uncoupled-core multicore optical fiber 110 is greater than or equal to 0.085 ps/nm$^2$/km and less than or equal to 0.093 ps/nm$^2$/km. It should be understood that the dispersion slope at 1310 nm of each core portion $C_i$ of the uncoupled-core multicore optical fiber 110 may be within a range formed from any one of the lower bounds for dispersion slope at 1310 nm and any one of the upper bounds of dispersion slope at 1310 nm described herein.

In various embodiments, dispersion at 1550 nm of each core portion $C_i$ of the uncoupled-core multicore optical fiber 110 is greater than or equal to 17 ps/nm/km and less than or equal to 20 ps/nm/km. It should be understood that the dispersion at 1550 nm of each core portion $C_i$ of the uncoupled-core multicore optical fiber 110 may be within a range formed from any one of the lower bounds for dispersion at 1550 nm and any one of the upper bounds of dispersion at 1550 nm described herein.

In various embodiments, the dispersion slope at 1550 nm of each core portion $C_i$ of the uncoupled-core multicore optical fiber 110 is greater than or equal to 0.060 ps/nm$^2$/km and less than or equal to 0.070 ps/nm$^2$/km. It should be understood that the dispersion slope at 1550 nm of each core portion $C_i$ of the uncoupled-core multicore optical fiber 110 may be within a range formed from any one of the lower bounds for dispersion slope at 1550 nm and any one of the upper bounds of dispersion slope at 1550 nm described herein.

Referring again to FIG. 5, in embodiments, each core portion $C_i$ is fabricated such that the varying relative refractive index $\Delta_3$ of the depressed cladding region 170 is determined by a down-dopant concentration D that varies with radial coordinate r, i.e., D=D(r). In embodiments, the down-dopant is fluorine and D(r) is expressed as a radially-dependent fluorine concentration F(r). As such, F(r) within the depressed cladding region 170 may vary between a minimum value $F_{min}$ and a maximum value $F_{max}$. In embodiments, $F_{min}$ is at the radial position $r_2$ and $F_{max}$ is at the radial position $r_3$. In embodiments, $F_{min}$ 0 wt %. In embodiments, $F_{max}$ is greater than or equal to 1.2 wt. % and less than or equal to 2.0 wt. %. In embodiments, $F_{max}$ is greater than or equal to 1.2 wt. % and less than or equal to 1.8 wt. %.

The values of the down-dopant concentrations (e.g., $F_{max}$ and $F_{min}$) within the depressed cladding region 170 determine the refractive index profile therein, and therefore the trench volume $V_T$ of the depressed cladding regions 170 and 170' in FIGS. 6 and 7. Without wishing to be bound by theory, it is believed that the trench volume determines a zero dispersion wavelength of each of the core portions $C_i$. As described herein, the down-dopant concentrations may be selected such that the zero dispersion wavelength for each of the core portions $C_i$ is greater than or equal to 1300 nm and less than or equal 1324 nm. To achieve such a zero dispersion wavelength, the trench volume within the depressed cladding region 170 of each core portion $C_i$ may be 30% $\Delta$ µm$^2$ and less than 75% $\Delta$ µm$^2$.

Figure 8:
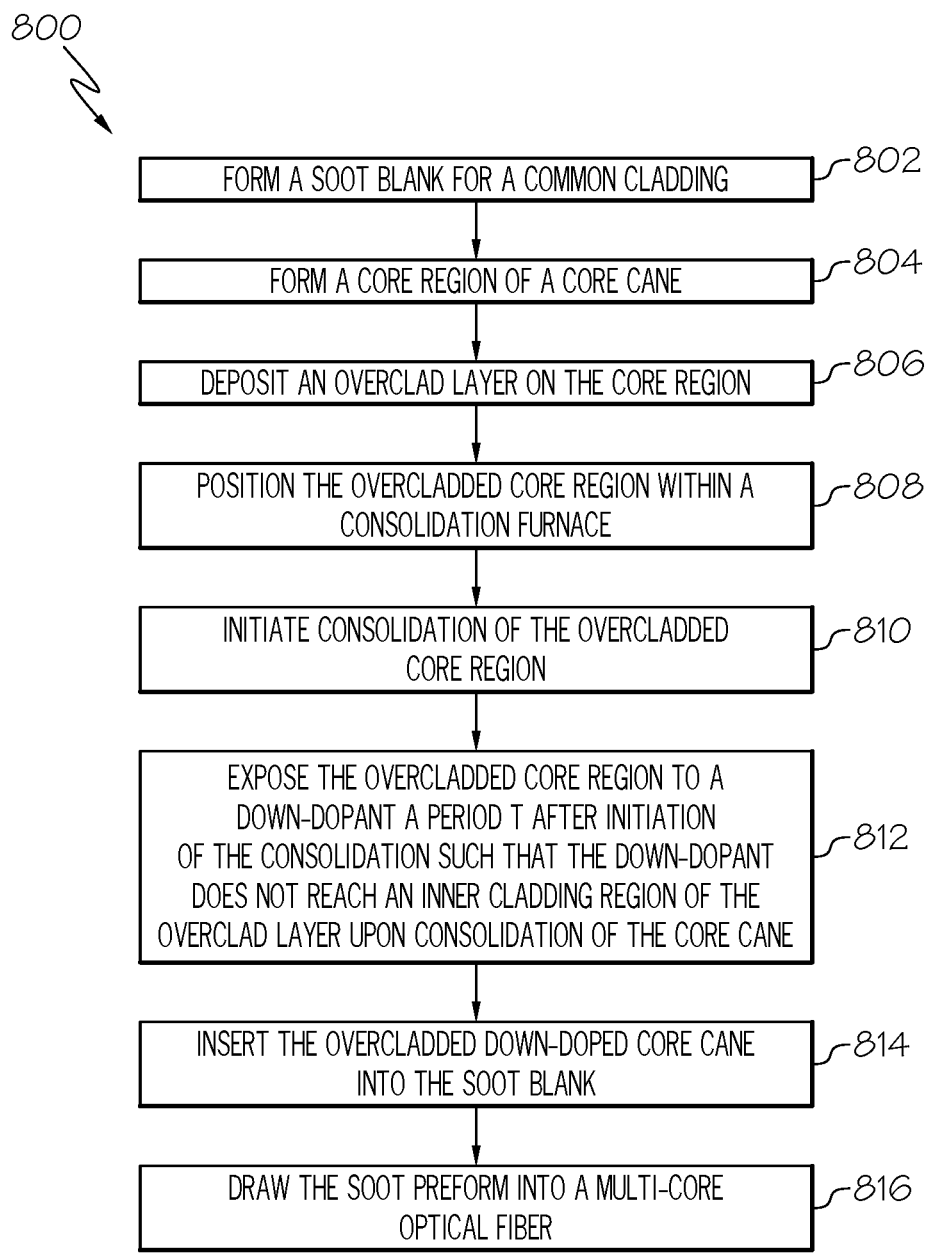
FIG. 8 depicts a flow diagram of a method of making a multimode optical fiber comprising a core portion comprising a core region, an inner cladding region, and a depressed cladding region, according to one or more embodiments described herein.

The multicore optical fiber 110 of the present disclosure can be made using any suitable method for forming a multicore optical fiber. See, for example, U.S. patent application Ser. No. 16/791,708, filed on Feb. 14, 2020, the disclosure of which is incorporated herein by reference in their entirety. Referring now to FIG. 8 by way of example, a flow diagram of a method 800 of forming a multicore optical fiber is depicted. The method 800 may be used to form the uncoupled-core multicore optical fiber 110 (or any of the alternative embodiments thereof) described herein with respect to FIGS. 1-7. In a step 802, a soot blank for the common cladding 19 is formed. Formation of the soot blank may involve first forming a soot body via an outside vapor deposition ("OVD") process, a soot pressing method, a vapor axial deposition ("VAD") process, or any other known method. The soot body may be formed of a glass precursor material. In embodiments, the soot body is formed of silica-based material. For example, in an OVD process, an inert rod may be layered with silica-based soot particles that are formed by passing vapors, such as silicon tetrachloride ($SiCl_4$) vapors through a burner flame such that the vapors react in the flame to form fine silica-based soot particles that are deposited on the inert rod. After soot deposition is complete, the inert rod may be removed and the soot body may be partially consolidated to reach a bulk density compatible for drilling to form the soot blank. The soot blank may then be drilled using known techniques to create openings for core cane insertion.

In a step 804, a core region of a core cane may be formed. In embodiments, the core region may correspond to the core region 150 described herein with respect to FIGS. 5-7 upon completion of the method 800 (e.g., after drawing). The core region may be formed via an OVD process, a soot pressing method, a VAD process, or any known method. The core region may be formed to possess a relative refractive index $\Delta_1(r)$ described with respect to FIGS. 5-7 herein after completion of the method 800. As such, the core region may be formed using an up-dopant. In an example, the core region may be formed using an OVD process where $SiCl_4$ vapors are mixed with an up-dopant vapor (e.g., germanium-containing vapor) and the vapors are passed through a burner and reacted to form soot particles on an inert rod. In embodiments, after the OVD process is complete, the core region may be partially consolidated by heating the core region to a temperature lower than a normal sintering peak temperature of the material used to form the core region for a predetermined time.

In a step 806, an overclad layer is deposited on the on the core region. In embodiments, a soot overclad layer of silica-based soot is formed on the core region via an OVD or VAD process. In steps 808 and 810, the overcladded core region is positioned within a consolidation furnace and consolidation of the overcladded core region is initiated. For example, the overcladded core region may be heated to a peak sintering temperature to initiate consolidation.

Figure 9:
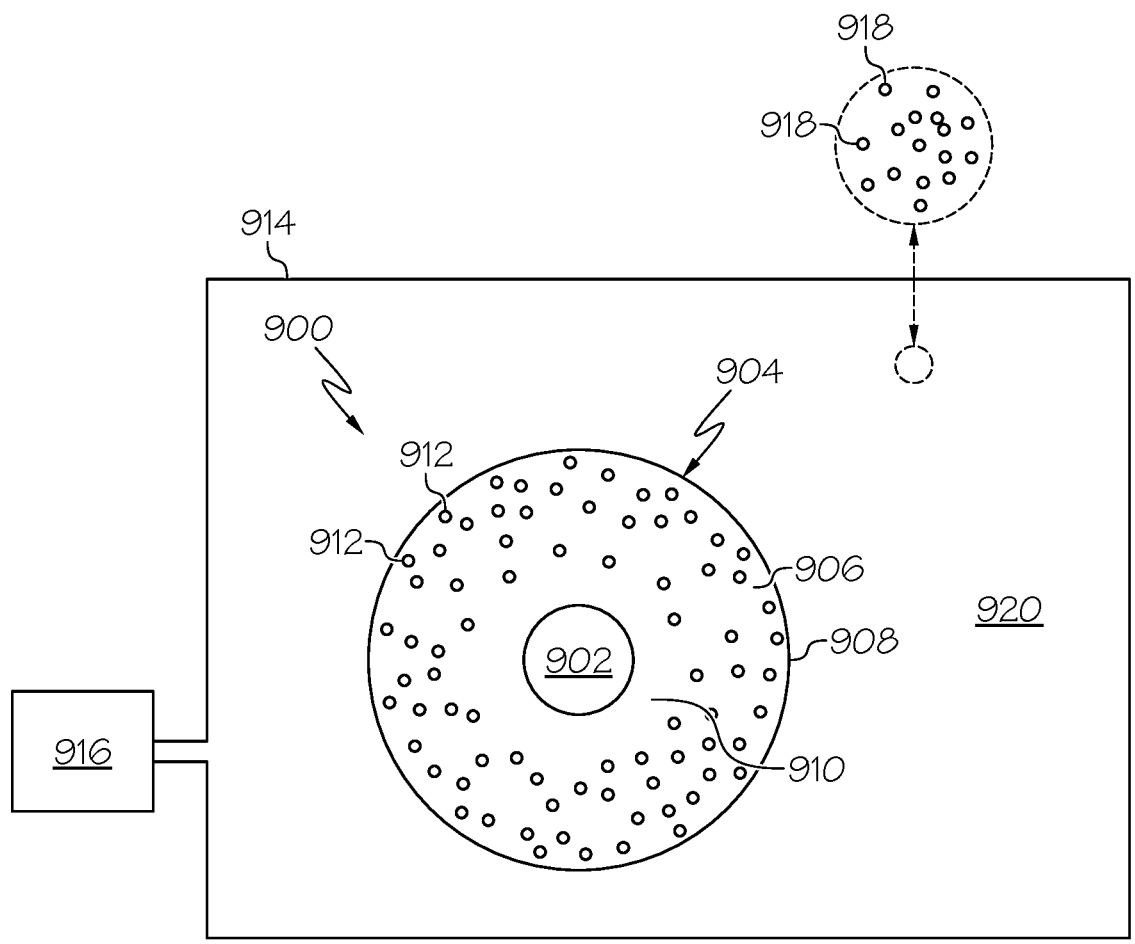
FIG. 9 schematically depicts a process of consolidating a core cane while exposing the core cane to a down-dopant to create a depressed cladding region, according to one or more embodiments described herein.

In a step 812, during the consolidation, the overcladded core region is exposed to a down-dopant for a period T after initiation of the consolidation such that the down-dopant does not reach an inner cladding region of the overclad upon consolidation. FIG. 9 schematically depicts an example consolidation furnace 914 that may be used to carry out the steps 808, 810, and 812 described herein. FIG. 9 depicts a soot preform 900 resulting from the completion of the consolidation process. The soot preform 900 includes a core region 902 and an overcladding layer 904 surrounding the core region 902. During the step 808, the core region 902 (e.g., in an unconsolidated or partially consolidated state) and overcladding layer 904 may be placed in an interior 920 of a consolidation furnace 914. The consolidation furnace 914 may be heated to a peak sintering temperature of the overcladding layer 904 to initiate consolidation.

A gas source 916 is in fluid communication with the interior 920 of the consolidation furnace 914. The gas source 916 provides a gas 918 containing a down-dopant 912 into the interior 920. The down-dopant 912 (e.g., fluorine) then diffuses through the overcladding layer 904 during consolidation. In embodiments, the rate of diffusion of the down-dopant 912 through the overcladding layer is dependent on the compositional and material properties of the overcladding layer 904 (e.g., porosity, density, etc.). As the overcladding layer 904 is consolidated, the porosity of the overcladding layer 904 is diminished such that a rate of diffusion of the down-dopant 912 may decrease as the overcladding layer 904 consolidates.

As described herein, the core region 902 may contain an up-dopant such as germanium. The presence of the down-dopant and the up-dopant in the core region 902 may modify a refractive index profile of the core portion resulting from performance of the method 800 such that the core portion does not possess desired properties (e.g., mode field diameter, zero dispersion wavelength, cutoff wavelength, trench volume). As such, the time period T after initiation of the consolidation that the down-dopant 912 is introduced into the interior 920 may be determined such that the down-dopant 912 does not diffuse through the entirety of the overcladding layer 904 prior to the overcladding layer 904 becoming consolidated. The time period T may be determined based on a rate of diffusion of the down-dopant 912 through the overcladding layer 904 and an estimated consolidation time for the soot preform 900. For example, based on a thickness of the overcladding layer 904, the time period T may be selected such that only a portion of the overcladding layer 904 contains the down-dopant 912 when the soot preform 900 is consolidated.

As depicted in FIG. 9, an inner cladding region 910 of the overcladding layer 904 is substantially free of the down dopant 912 after consolidation. Consolidation of the overcladding layer 904 may prevent the down dopant 912 from diffusing into the inner cladding region 910. In embodiments, the inner cladding region 910 corresponds to the inner cladding region 160 described herein with respect to FIGS. 5-7 upon completion of the method 800. An outer region 906 of the overcladding layer 904 possess a variable concentration of the down-dopant 912. The outer surface 908 of the overcladding layer 904 may have been exposed to the down-dopant 912 for a greatest time period, and therefore possess a highest concentration of down-dopant 912. In embodiments, the outer region 906 corresponds to the depressed cladding region 170 possessing a trench in the relative refractive index profile thereof described herein with respect to FIGS. 5-7 upon completion of the method 800.

Referring back to FIG. 8, in a step 812, after the overcladded core region is consolidated into the soot preform 900, the soot preform 900 is inserted into holes drilled into the soot blank formed during the step 802. The steps 804, 806, 808, 810, and 812 may be repeated any number of times to insert any number of soot preforms corresponding to a desired number of core portions to be incorporated into the uncoupled-core multimodal optical fiber to form a fiber preform. In a step 816, after each soot preform is inserted into the soot blank, the fiber preform is drawn into a multicore optical fiber.

EXAMPLES

The embodiments described herein will be further clarified by the following examples.

Triangular Trench Examples

Two multicore fiber designs having two different core portion designs (Example A and Example B) were mathematically modeled to determine the optical properties of the fibers. Each core region of the core portions of both multi-core optical fibers was up-doped with germanium. In embodiments, each core region is up-doped with germania to comprise a maximum germania concentration of greater than or equal to 6 wt. % and less than or equal to 6.7 wt. %. In embodiments, each of the core portions also included a depressed cladding region down-doped with fluorine. The depressed cladding regions may comprise a maximum fluorine concentration that is greater than or equal to 1.6 wt. % and less than or equal to 1.85 wt. %. Each core portion in both the multicore optical fibers were modeled with the structure depicted in FIG. 5. That is, each of the core portions in Examples A and B were modeled to include a core region 150, an inner cladding region 160 encircling and in direct contact with the core region 150, and a depressed cladding region 170 encircling and in direct contact with the inner cladding region 160 and defining a trench in the relative refractive index profiles of the core portions. Each multicore optical fiber in Examples A and B has an outer common cladding constructed of undoped silica-based glass having a radius $R_{CC}$=62.5 µm. Each core portion $C_i$ in Example A possessed the relative refractive index profile depicted in FIG. 6. Each core portion $C_i$ in Example B possessed the relative refractive index profile depicted in FIG. 7. The structure and optical properties of the optical fibers of Examples A and B are set forth in Table 1.

Geometric parameters, including, the values of $r_1$, $r_2$, and $r_3$, in µm, of each of the core portions as well as $R_{CC}$ of the common cladding in the described examples, in µm, were determined. Physical characteristics, including, the zero dispersion wavelength in nm of each core, the effective area ($A_{eff}$) of the cores in µm$^2$, the mode field diameter at 1310 nm in microns of each core, the mode field diameter at 1510 nm in microns of each core, the cable cutoff in nm of each core, average 1×15 mm diameter bend loss at 1550 nm in dB/turn, average 1×20 mm diameter bend loss at 1550 nm in dB/turn, average 1×30 mm diameter bend loss at 1550 nm in dB/turn, the dispersion at 1310 nm in ps/nm/km of each core, dispersion slope at 1310 nm in ps/nm$^2$/km of each core, the dispersion at 1550 nm in ps/nm/km of each core, and the dispersion slope at 1550 nm in ps/nm$^2$/km of each core, were also determined.

TABLE 1

Examples A and B

| Parameter | Example A | Example B |
| --- | --- | --- |
| Maximum Core Index, $\Delta_{1max}$ (%) | 0.336 | 0.37 |
| Core Region Radius, $r_1$, microns | 4.2 | 5.3 |
| Core α | 12 | 2.2 |
| Inner Cladding Index, $\Delta_2$ (%) | 0 | 0 |
| Inner Cladding Region Radius, $r_2$ (microns) | 7.16 | 7.45 |
| Depressed Cladding Region Shape | Triangular | Triangular |
| Depressed Cladding Region Minimum Index, $\Delta_{3min}$ (%) | −0.5 | −0.55 |
| Depressed Cladding Region Outer Radius, $r_3$ (micron) | 15.9 | 14.9 |
| Volume of First Depressed Cladding Region, $V_T$, % Δ micron$^2$ | −56.9 | −50.94 |
| Common Cladding Index, $\Delta_{CC}$ (%) | 0 | 0 |
| Common Cladding Radius, $R_{CC}$, microns | 62.5 | 62.5 |
| Mode Field Diameter (micron) at 1310 nm | 9.1 | 9.1 |
| Effective Area at 1310 nm (micron$^2$) | 64.5 | 62.4 |
| Zero Dispersion Wavelength (nm) | 1314 | 1319 |
| Dispersion at 1310 nm (ps/nm/km) | −0.36 | −0.837 |
| Dispersion Slope at 1310 nm (ps/nm2/km) | 0.090 | 0.093 |
| Mode Field Diameter (micron) at 1550 nm | 10.21 | 10.22 |
| Effective Area at 1550 nm (micron$^2$) | 79.78 | 78.69 |
| Dispersion at 1550 nm (ps/nm/km) | 18.32 | 18.27 |
| Dispersion Slope at 1550 nm (ps/nm2/km) | 0.064 | 0.065 |
| Cable Cutoff (nm) | 1226 | 1204 |
| Bend Loss for 15 mm mandrel diameter at 1550 nm (dB/turn) | 0.093 | 0.123 |
| Bend Loss for 20 mm mandrel diameter at 1550 nm (dB/turn) | 0.023 | 0.113 |
| Bend Loss for 30 mm mandrel diameter at 1550 nm (dB/turn) | 0.0025 | 0.004 |

As shown in Examples A and B, the optical fibers described herein are capable of achieving an effective area $A_{eff}$ at 1310 nm for each core portion of greater than or equal to 60 µm$^2$ and less than or equal to 72 µm$^2$. In embodiments, the optical fibers described herein are capable of achieving an effective area $A_{eff}$ at 1310 nm for each core portion of greater than or equal to 63 µm$^2$ and less than or equal to 70 µm$^2$. The optical fibers described herein also demonstrate a mode field diameter at 1310 nm of greater than or equal to 9 µm and less than or equal to 9.5 µm to facilitate coupling with a standard single mode fibers. In embodiments, the optical fibers described herein have a mode field diameter of greater than or equal to 9.1 µm and less than or equal to 9.2 µm to facilitate coupling with a standard single mode fiber. The optical fibers described herein also demonstrate a cable cutoff of less than or equal to 1260 nm (e.g., less than or equal to 1230 nm), demonstrating capacity of the core portions herein for single mode transmission.

As shown in Examples A and B, each core portion of the optical fibers described herein have a zero dispersion wavelength greater than or equal to 1300 nm and less than or equal to 1324 nm to facilitate long-term transmission of optical signals within that wavelength range. While not shown in Examples A and B in embodiments, the core-portions of each of the optical fibers described herein have a cross talk of less than or equal to −30 dB (e.g., less than or equal to −40 dB, or even less than or equal to −50 dB) with adjacent core portions. To achieve cross talk values in such ranges, the core portions of the optical fibers described herein may be separated from one another by at least a minimum separation distance that is greater than or equal to 30 µm (e.g., greater than or equal to 35 µm, greater than or equal to 40 µm). In embodiments, to prevent tunneling loss within the optical fibers described herein, core portions of the optical fibers herein may be separated from an outer edge (e.g., an outer edge of a common cladding) by at least a minimum core edge to fiber edge distance that is greater than or equal to 18 µm (e.g., greater than or equal to 20 µm, greater than or equal to 25 µm).

Rectangular Trench Examples

In additional examples, another two multicore fiber designs having two different core portion designs (Example C and Example D) were mathematically modeled to determine the optical properties of the fibers. Each core region of the core portions of both multicore optical fibers was up-doped with germanium. In embodiments, each core region is up-doped with germania to comprise a maximum germania concentration of greater than or equal to 6 wt. % and less than or equal to 6.7 wt. %. In embodiments, each of the core portions also included a depressed cladding region down-doped with fluorine. The depressed cladding regions may comprise a maximum fluorine concentration that is greater than or equal to 1.5 wt. % and less than or equal to 1.7 wt. %. Each core portion in both the multicore optical fibers were modeled with the structure depicted in FIG. 5. That is, each of the core portions in Examples C and D were modeled to include a core region 150, an inner cladding region 160 encircling and in direct contact with the core region 150, and a depressed cladding region 170 encircling and in direct contact with the inner cladding region 160 and defining a trench in the relative refractive index profiles of the core portions. Each multicore optical fiber in Examples C and D has an outer common cladding constructed of undoped silica-based glass having a radius $R_{CC}$=62.5 µm. Examples C and D differ from the Examples A and B described herein in that the Examples C and D include depressed cladding regions 170 with a rectangular trench profile. That is, the relative refractive index $\Delta_3$ remains substantially constant within the depressed cladding regions 170 of examples C and D at the minimum relative refractive index $\Delta_{3\,min}$. In embodiments, the depressed cladding regions 170 define a trench having a trench volume $V_T$ greater than or equal to 40% $\Delta$ µm² and less than or equal to 70% $\Delta$ µm².

Geometric parameters, including, the values of $r_1$, $r_2$, and $r_3$, in µm, of each of the core portions $C_i$, as well as $R_{CC}$ of the common cladding in the described examples, in µm, were determined. Physical characteristics, including, the zero dispersion wavelength in nm of each core, the effective area ($\Delta_{eff}$) of the cores in µm², the mode field diameter at 1310 nm in microns of each core, the mode field diameter at 1510 nm in microns of each core, the cable cutoff in nm of each core, average 1×15 mm diameter bend loss at 1550 nm in dB/turn, average 1×20 mm diameter bend loss at 1550 nm in dB/turn, average 1×30 mm diameter bend loss at 1550 nm in dB/turn, the dispersion at 1310 nm in ps/nm/km of each core, dispersion slope at 1310 nm in ps/nm²/km of each core, the dispersion at 1550 nm in ps/nm/km of each core, and the dispersion slope at 1550 nm in ps/nm²/km of each core, were also determined.

TABLE 2

Examples C and D

| Parameter | Example C | Example D |
| --- | --- | --- |
| Maximum Core Index, $\Delta_{1max}$ (%) | 0.336 | 0.37 |
| Core Region Radius, $r_1$, microns | 4.2 | 5.3 |
| Core α | 12 | 2.2 |
| Inner Cladding Region Index, $\Delta_2$ (%) | 0 | 0 |
| Inner Cladding Region Radius, $r_2$ (microns) | 9.14 | 10.56 |
| Depressed Cladding Region Shape | Rectangular | Rectangular |
| Depressed Cladding Region Minimum Index, $\Delta_{3,min}$ (%) | −0.45 | −0.5 |
| Depressed Cladding Region Outer Radius, $r_3$ (micron) | 14.2 | 14.6 |
| Volume of Depressed Cladding Region, $V_T$ % $\Delta$ micron² | −53.14 | −50.82 |
| Common Cladding Index, $\Delta_{CC}$ (%) | 0 | 0 |
| Mode Field Diameter (micron) at 1310 nm | 9.07 | 9.26 |
| Effective Area at 1310 nm (micron²) | 64.5 | 65.29 |
| Zero Dispersion Wavelength (nm) | 1310 | 1318 |
| Dispersion at 1310 nm (ps/nm/km) | 0 | −0.736 |
| Dispersion Slope at 1310 nm (ps/nm2/km) | 0.092 | 0.092 |
| Mode Field Diameter (micron) at 1550 nm | 10.14 | 10.45 |
| Effective Area at 1550 nm (micron²) | 79.16 | 82.43 |
| Dispersion at 1550 nm (ps/nm/km) | 19.03 | 18.35 |
| Dispersion Slope at 1550 nm (ps/nm2/km) | 0.066 | 0.066 |
| Cable Cutoff (nm) | 1215 | 1200 |
| Bend Loss for 15 mm mandrel diameter at 1550 nm (dB/turn) | 0.118 | 0.138 |
| Bend Loss for 20 mm mandrel diameter at 1550 nm (dB/turn) | 0.04 | 0.082 |
| Bend Loss for 30 mm mandrel diameter at 1550 nm (dB/turn) | 0.0063 | 0.012 |

As shown in Examples C and D, the optical fibers described herein are capable of achieving an effective area $\Delta_{eff}$ at 1310 nm for each core portion of greater than or equal to 60 µm² and less than or equal to 72 µm². In embodiments, the optical fibers described herein are capable of achieving an effective area $\Delta_{eff}$ at 1310 nm for each core portion of greater than or equal to 63 µm² and less than or equal to 70 µm². The optical fibers described herein also demonstrate a mode field diameter at 1310 nm of greater than or equal to 9 µm and less than or equal to 9.5 µm to facilitate coupling with a standard single mode fibers. The optical fibers described herein also demonstrate a cable cutoff of less than or equal to 1260 nm (e.g., less than or equal to 1230 nm), demonstrating capacity of the core portions herein for single mode transmission.

As shown in Examples C and D, each core portion of the optical fibers described herein have a zero dispersion wavelength greater than or equal to 1300 nm and less than or equal to 1324 nm to facilitate long-term transmission of optical signals within that wavelength range. While not shown in Examples C and D in embodiments, the core-portions of each of the optical fibers described herein have a cross talk of less than or equal to −30 dB (e.g., less than or equal to −40 dB, or even less than or equal to −50 dB) with adjacent core portions.

As is apparent from the foregoing description, uncoupled-core multicore optical fibers comprising a plurality of core portions with depressed cladding regions surrounding core regions provide relatively low cross-talk among the core portions while achieving relatively high fiber density. Additionally, such depressed cladding regions provide relatively low bend loss for the multicore optical fibers. Depressed cladding regions with relative refractive indexes that decrease monotonically with increasing radius may beneficially be produced by a method where the depressed cladding region is consolidated in a single step with a core region having a refractive index during doping. Embodiments of the present disclosure facilitate incorporating of a plurality of core portions (e.g., greater than or equal to 3 core portions and less than or equal to eight core portions) into a standard 125 µm optical fiber while still providing relatively low cross-talk (e.g., less than −30 dB) while maintaining a mode field diameter of each core portion to greater than or equal to 8.2 µm to facilitate coupling with standard single mode fibers.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A multicore optical fiber comprising:
   a common cladding; and
   a plurality of core portions disposed in the common cladding, each of the plurality of core portions comprising:
   a central axis;
   a core region extending from the central axis to a radius $r_1$, the core region comprising a relative refractive index $\Delta_1$ relative to pure silica;
   an inner cladding region encircling and directly contacting the core region and extending from the radius $r_1$ to a radius $r_2$, the inner cladding region comprising a relative refractive index $\Delta_2$ relative to pure silica; and
   a depressed cladding region encircling and directly contacting the inner cladding region and extending from the radius $r_2$ to a radius $r_3$, the depressed cladding region comprising a relative refractive index $\Delta_3$ relative to pure silica and a minimum relative refractive index $\Delta_{3\ min}$ relative to pure silica, wherein:

$\Delta_1 > \Delta_2 > \Delta_{3\ min}$;

the relative refractive index $\Delta_3$ of the entire depressed cladding region in each of the plurality of core portions is less than or equal to $\Delta_2$ such that the depressed cladding region forms a depressed-index trench in a relative refractive index profile of each core portion;
   the depressed-index trench in the relative refractive index profile of each core portion has a trench volume of greater than or equal to 30% $\Delta$ μm$^2$ and less than or equal to 75% $\Delta$ μm$^2$;
   the mode field diameter of each core portion is greater than or equal to 8.2 μm and less than or equal to 9.5 μm at a 1310 nm wavelength; and
   the zero dispersion wavelength of each core portion is greater than or equal to 1300 nm and less than or equal to 1324 nm.

2. The multicore optical fiber of claim 1, wherein the common cladding comprises an outer radius $R_{CC}$ that is greater than or equal to 120 μm and less than or equal to 200 μm.

3. The multicore optical fiber of claim 2, wherein the plurality of core portions comprises greater than or equal to 3 core portions and less than or equal to 8 core portions.

4. The multicore optical fiber of claim 3, wherein the outer radius $R_{CC}$ is equal to 125 μm.

5. The multicore optical fiber of claim 3, wherein the plurality of core portions are arranged in a 2×2 arrangement within the common cladding such that each central axis of a core portion of the plurality of core portions is separated from central axes of two adjacent core portions by a minimum core-to-core separation distance greater than or equal to 35 μm.

6. The multicore optical fiber of claim 1, wherein a cable cutoff wavelength of each of the plurality of core portions is less than or equal to 1260 nm.

7. The multicore optical fiber of claim 1, wherein the relative refractive index $\Delta_3$ of the depressed cladding region of each core portion monotonically decreases from $\Delta_2$ at the radius $r_2$ to $\Delta_{3\ min}$ at $r_3$.

8. The multicore optical fiber of claim 7, wherein the relative refractive index $\Delta_3$ of the depressed cladding region of each core portion continuously decreases from $\Delta_2$ at the radius $r_2$ to $\Delta_{3\ min}$ at $r_3$ such that the trench has a substantially triangular-shape.

9. The multicore optical fiber of claim 7, wherein the relative refractive index $\Delta_{3\ min}$ of the depressed cladding region of each core portion is less than or equal $-0.2\%\ \Delta$ and greater than or equal to $-0.6\%\ \Delta$.

10. The multicore optical fiber of claim 7, wherein the depressed cladding region of each core portion comprises a down-dopant having a concentration that varies with radial distance from the central axis such that the depressed cladding region comprises a maximum down-dopant concentration at $r_3$ and a minimum down-dopant concentration at $r_2$.

11. The multicore optical fiber of claim 10, wherein the down-dopant is fluorine and the maximum down-dopant concentration is greater than or equal to 1.2 wt % and less than or equal to 2.0 wt %.

12. The multicore optical fiber of claim 10, wherein the inner cladding region of each of the core portions is substantially free of the down-dopant.

13. The multicore optical fiber of claim 1, wherein the central axes of the plurality of core portions are separated from one another by a minimum separation distance that is greater than or equal to 35 microns.

14. The multicore optical fiber of claim 13, wherein a cross-talk between each of the plurality of core portions and a nearest one of the plurality of core portions is less than or equal to $-30$ dB.

15. A multicore optical fiber comprising:
    a common cladding; and
    a plurality of core portions disposed in the common cladding, each of the plurality of core portions comprising:
    a central axis;
    a core region extending from the central axis to a radius $r_1$, the core region comprising a relative refractive index $\Delta_1$ relative to pure silica;
    an inner cladding region encircling and directly contacting the core region and extending from the radius $r_1$ to a radius $r_2$, the inner cladding region comprising a relative refractive index $\Delta_2$ relative to pure silica; and
    a depressed cladding region extending encircling and directly contacting the inner cladding region and from the radius $r_2$ to a radius $r_3$, the depressed cladding region comprising a relative refractive index $\Delta_3$ relative to pure silica and a minimum relative refractive index $\Delta_{3\ min}$ relative to pure silica, wherein:

$\Delta_1 > \Delta_2 > \Delta_{3\ min}$;

$\Delta_2 \geq \Delta_3$ such that the depressed cladding region forms a depressed-index trench in a relative refractive index profile of each core portion between $r_2$ and $r_3$; and
    $\Delta_3$ monotonically decreases to the minimum relative refractive index $\Delta_{3\ min}$ with increasing radial distance from the central axis of each core portion.

16. The multicore optical fiber of claim 15, wherein the mode field diameter of each core portion is greater than or equal to 8.2 μm and less than or equal to 9.5.

17. The multicore optical fiber of claim 15, wherein the zero dispersion wavelength of each core portion is greater than or equal to 1300 nm and less than or equal to 1324 nm.

18. The multicore optical fiber of claim 15, wherein a cable cutoff wavelength of each of the plurality of core portions is less than or equal to 1260 nm.

19. The multicore optical fiber of claim 15, wherein each core region comprises a maximum relative refractive index $\Delta_{1\ max}$ relative to pure silica, wherein $\Delta_{1\ max}$ in each of the core portions is greater than or equal to 0.28% $\Delta$ and less than or equal to 0.45% $\Delta$.

20. The multicore optical fiber of claim 15, wherein the common cladding comprises an outer radius $R_{CC}$ that is greater than or equal to 120 µm and less than or equal to 200 µm.

21. The multicore optical fiber of claim 20, wherein the plurality of core portions comprises greater than or equal to 3 core portions and less than or equal to 8 core portions.

22. The multicore optical fiber of claim 15, wherein the relative refractive index $\Delta_3$ of the depressed cladding region of each core portion continuously decreases from $\Delta_2$ at the radius $r_2$ to $\Delta_{3\ min}$ at $r_3$ such that the trench has a substantially triangular-shape.

* * * * *

UNITED STATES PATENT AND TRADEMARK OFFICE
CERTIFICATE OF CORRECTION

PATENT NO. : 11,579,355 B2
APPLICATION NO. : 17/443588
DATED : February 14, 2023
INVENTOR(S) : Pushkar Tandon et al.

Page 1 of 2

It is certified that error appears in the above-identified patent and that said Letters Patent is hereby corrected as shown below:

On the Title Page

In item (57), in Column 2, in "Abstract", Line 11, delete "$\Delta_{3\ min}$." and insert -- $\Delta_{3min}$. --.

In item (57), in Column 2, in "Abstract", Line 12, delete "$\Delta_{3\ min}$." and insert -- $\Delta_{3min}$. --.

On the page 2, in Column 2, item (56) under "Other Publications", Line 2, delete "Perturbations," and insert -- Perturbations," --.

In the Claims

In Column 29, Line 22, in Claim 1, delete "$\Delta_{3\ min}$" and insert -- $\Delta_{3min}$ --.

In Column 29, Line 25, in Claim 1, delete "$\Delta_{3\ min}$;" and insert -- $\Delta_{3min}$; --.

In Column 29, Line 65, in Claim 7, delete "$\Delta_{3\ min}$" and insert -- $\Delta_{3min}$ --.

In Column 30, Line 2, in Claim 8, delete "$\Delta_{3\ min}$" and insert -- $\Delta_{3min}$ --.

In Column 30, Line 5, in Claim 9, delete "$\Delta_{3\ min}$" and insert -- $\Delta_{3min}$ --.

In Column 30, Line 6, in Claim 9, after "equal" insert -- to --.

In Column 30, Line 51, in Claim 15, delete "$\Delta_{3\ min}$" and insert -- $\Delta_{3min}$ --.

In Column 30, Line 54, in Claim 15, delete "$\Delta_{3\ min}$;" and insert -- $\Delta_{3min}$; --.

In Column 30, Line 60, in Claim 15, delete "$\Delta_{3\ min}$" and insert -- $\Delta_{3min}$ --.

In Column 30, Line 64, in Claim 16, delete "9.5." and insert -- 9.5 µm. --.

Signed and Sealed this
Fifteenth Day of August, 2023

Katherine Kelly Vidal
*Director of the United States Patent and Trademark Office*

CERTIFICATE OF CORRECTION (continued)
U.S. Pat. No. 11,579,355 B2

In Column 31, Line 6, in Claim 19, delete "$\Delta_{1\ max}$" and insert -- $\Delta_{1max}$ --.

In Column 31, Line 6, in Claim 19, delete "$\Delta_{1\ max}$" and insert -- $\Delta_{1max}$ --.

In Column 31, Line 19, in Claim 22, delete "$\Delta_{3\ min}$" and insert -- $\Delta_{3min}$ --.